United States Patent [19]

Carmein

[11] Patent Number: 5,490,784
[45] Date of Patent: Feb. 13, 1996

[54] VIRTUAL REALITY SYSTEM WITH ENHANCED SENSORY APPARATUS

[76] Inventor: David E. E. Carmein, 4921 Upton Ave. South, Minneapolis, Minn. 55410

[21] Appl. No.: 145,413

[22] Filed: Oct. 29, 1993

[51] Int. Cl.⁶ .................................................. G09B 9/00
[52] U.S. Cl. .......................... 434/55; 434/29; 434/307 R; 434/365
[58] Field of Search ................................. 434/29, 30, 34, 434/35, 37, 38, 40, 43, 45, 55, 58, 59, 62, 69, 118, 307 R, 365, 372; 472/2, 17, 60, 132; 273/85 R, 85 G, 85 B, 85 D, 438, 440, 484, DIG. 28; 364/410, 578; 73/379.01, 299, 323; 395/152, 161; 33/313, 366; 340/686; 455/89; 345/8; 348/121

[56] References Cited

U.S. PATENT DOCUMENTS

| | | | |
|---|---|---|---|
| 2,344,454 | 3/1944 | Plotner | 434/55 |
| 3,135,057 | 6/1964 | Nelson et al. | |
| 3,281,963 | 11/1966 | Johnson | |
| 3,514,102 | 5/1970 | Wakefield | |
| 4,489,932 | 12/1984 | Young | |
| 4,536,690 | 8/1985 | Belsterling et al. | 434/58 X |
| 4,545,574 | 10/1985 | Sassak | |
| 4,753,596 | 6/1988 | Hart et al. | 434/58 X |
| 4,856,771 | 8/1989 | Nelson et al. | |
| 4,908,558 | 3/1990 | Lordo et al. | |
| 4,995,603 | 2/1991 | Reed | 472/60 |
| 5,018,973 | 5/1991 | Alet et al. | 434/62 |
| 5,051,094 | 9/1991 | Richter et al. | 434/43 X |
| 5,060,932 | 10/1991 | Yamaguchi | |
| 5,179,525 | 1/1993 | Griffis et al. | 434/55 X |
| 5,182,150 | 1/1993 | Carlos et al. | 434/55 X |
| 5,185,561 | 2/1993 | Good et al. | 434/45 X |
| 5,320,538 | 6/1994 | Baum | 434/307 R |
| 5,322,441 | 6/1994 | Lewis et al. | 434/307 R |

OTHER PUBLICATIONS

McNeely, "Robotic Graphics: A New Approach to Force Feedback for Virtual Reality", ©1993, pp. 336–341.
Adam, Special Report: "Virtual Reality is for Real", Oct. 1993, IEEE Spectrum, pp. 22–29.
DeFanti, et al., Special Report, Virtual Reality: "A'room' with a 'view'", Oct. 1993, IEEE Spectrum, pp. 30–33.
"Virtual Environment Display System" by Fisher et al, ACM 1986 Workshop on Interactive 3D Graphics, Oct. 23–24, 1986, pp. 1–11.

*Primary Examiner*—Joe H. Cheng
*Attorney, Agent, or Firm*—Fredrikson & Byron

[57] ABSTRACT

A motion simulating device which is capable of creating motion with up to six degrees of freedom; three rotational degrees of freedom and three linear-translational degrees of freedom. The motion simulating device includes a generally spherical capsule abuttively supported on a plurality of rollers that are connected to a translatable frame. At least one of the rollers is a multi-directional active roller that frictionally engages the capsule to impart rotational motion to the capsule in any direction. The frame is optionally attached to a number of actuator legs which are capable of translating the frame along three orthogonal axes. Optimally, sights, sounds and physical sensations may be electronically coordinated and reproduced in the capsule so that a user may interactively control and respond to a variety of environments while simultaneously experiencing the corresponding motion and physical sensations associated with the interactive environment.

11 Claims, 19 Drawing Sheets

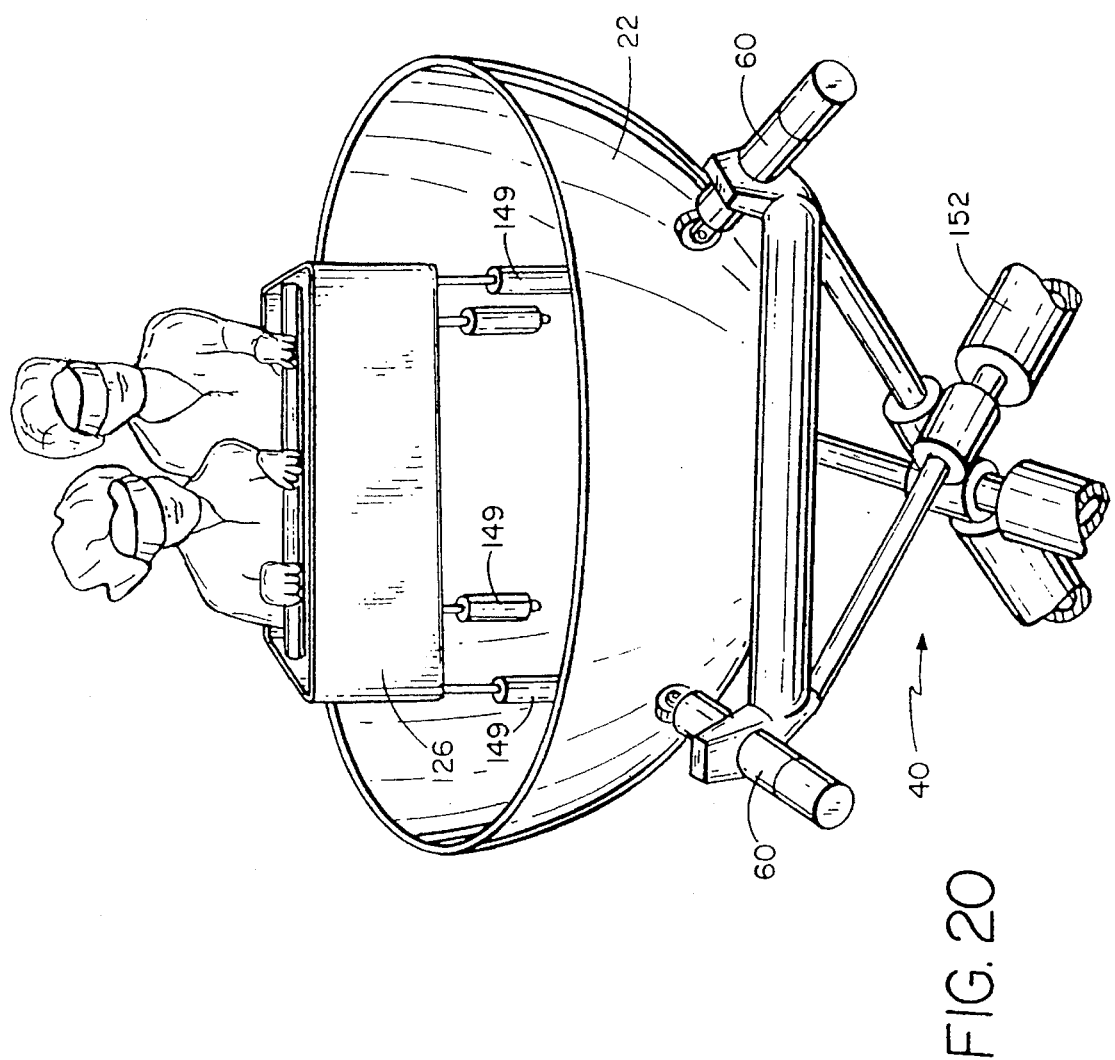

VIRTUAL REALITY SYSTEM WITH ENHANCED SENSORY APPARATUS

FIELD OF THE INVENTION

The present invention generally relates to training and entertainment devices and provides a device particularly useful in interactive simulation environments such as are encountered in flight simulators, computer-based video games, and "virtual reality" systems.

BACKGROUND OF THE INVENTION

In virtual reality, the sensation of motion is coordinated with the senses of sight, sound, and even touch. The "environment" that a person experiences is manufactured and contained in the silicon of computer processors and memory. Flight simulators used for training professional pilots and astronauts are a type of virtual reality system commonly in use today. As technology advances, the applications for "virtual reality" have grown well beyond such expensive, specialized equipment and are anticipated as being increasingly common as home entertainment or learning devices.

Although the hardware and software for generating the audio and visual components of virtual reality systems has been decreasing in cost, motion systems for use with such components to complete a virtual reality system have consistently been prohibitively expensive. Furthermore, the motion systems are either too complex, limited in their freedom of motion, or lack adequate responsiveness.

Various devices have been proposed for generating motion. U.S. Pat. No. 4,489,932, for example, describes a sphere resting on three passive casters, with motion of the sphere being actuated either by the user shifting his weight inside the sphere or by a multidirectional drive wheel. Another device for generating motion is found in U.S. Pat. No. 4,545,574, which discloses a sphere supported by an air stream moving within a large tube where the sphere is rotatable by louvers directing the force of the air around the sphere. Although both U.S. Pat. Nos. 4,489,932 and 4,545,574 describe a sphere rotatable about the three orthogonal axes at the center of the sphere, these devices cannot move the center of the sphere with respect to the external environment, i.e. they are not capable of linear motion. Moreover, these devices described in these patents also lack an interactive system coordinating motion, sight, and sound.

Other patents have proposed simulated motion devices which coordinate motion with audio and visual input. U.S. Pat. No. 3,135,057, for example, shows a capsule disposed within heavy inertial rings offset at 90° from one another. U.S. Pat. No. 4,856,771 shows a system that coordinates motion, video, and sound by using a cockpit situated inside two rings that are offset by 90° where the rings rest on a rotatable base. U.S. Patent No. 5,060,932 describes a large gyroscope-like device where various means of visual and aural stimulations are provided. Although U.S. Pat. Nos. 3,135,057, 4,856,771, and 5,060,932 describe motion devices that combine motion with audio and visual input, they all are limited in their applicability to virtual reality systems because of their slow response or large expense.

U.S. Pat. No. 4,908,558 describes a spherical motion simulator mounted on a stationary frame for angular and translational movement along pitch, roll and yaw axes. Magnetic bearing supported by the stationary frame provide three degrees of freedom. Drive means mounted on the stationary frame and connected to the test unit generate three degrees of freedom of movement.

U.S. Pat. No. 5,071,352 describes a motion platform with limited translational and rotational motion. An arrangement of three linear actuators is combined with an A-frame type restraining mechanism to allow rotation about the pitch and roll axes and along a vertical axis. A multiple-user capsule sits on a rigid frame and users view images and experience sound in coordination with motion.

Current devices for simulating motion are cumbersome and expensive. As a result, the devices have slow response times. Moreover, these devices are limited in their ability to provide linear and rotational motion about three orthogonal axes.

SUMMARY OF THE INVENTION

The present invention provides a mechanical system for creating motion with six full degrees of freedom; three rotational degrees of freedom and three linear-translational degrees of freedom. In its broader aspect, the present invention enables a user to physically experience full freedom of motion within a limited space.

In a preferred embodiment, the present invention provides a device in which the user will experience full freedom of motion in coordination with the user's senses of sight, hearing, and touch. A user utilizing the motion simulating device of the present invention will be able to interact with an electronic environment using many of the same senses used in the natural world. The claimed invention enables interaction with an electrically generated environment by employment of the user's natural center of balance center and sense of direction.

In its basic form, the motion simulating device consists of a generally spherical capsule that is supportively abutted by a number of rollers. At least one of the rollers is a multi-directional active roller that frictionally engages the capsule causing the capsule to rotate in any direction. A preferred embodiment uses three active rollers to impart rotational motion to the capsule. All rotational modes may be provided by rotating the sphere upon the rollers.

The linear, or translational, motion is imparted to the capsule by attaching the rollers to a movable frame. The translational modes are achieved by using actuator legs capable of moving the frame along one axis or, more preferably, with respect to three orthogonal axes.

Optimally, an interactive control means that coordinates sight, sound, and touch may be operatively connected to the capsule, active rollers, and frame. Through the interactive control means, a user may control and respond to a variety of environments and experience the corresponding motion associated with the user's control.

One objective of this invention is to enable the user to physically experience full freedom of motion in a responsive and less expensive device. Another objective of the invention is to permit a user to move in coordination with electronic simulation physical reality.

In accordance with another embodiment of the invention, active interactive solids and passive interactive solids are incorporated into a virtual reality system to impart the sensation of touch to the user. Interactive solids generally may be used to impart physical confirmation of what the user is touching in the virtual electronic environment. Active interactive solids are self-actuating objects operatively connected to the interactive control means. Active interactive solids may move in coordination with the electronic simulation of physical reality and physical input from the user. Passive interactive solids are not self-activating, and as such, provide physical confirmation of fixed objects generated in the virtual environment.

An active interactive solid may include an interactive support apparatus which is disposed within the capsule to impart the sensation of touch to the user. The interactive support apparatus includes a translatable support arm connected to a pneumatic support suit. A user can experience the sensation of support such as floating in water or other physical activity by imparting resistive forces to the pneumatic support suit.

The instant invention imparts full rotational freedom while minimizing the number of moving parts. Such freedom may be experienced as a "barrel" roll as they fly in a virtually-created fighter jet, or the tumbling of a virtual car involved in an end-over-end drivers' training accident.

The present invention efficiently utilizes the relatively low moment of inertia inherent in a rigid and light spherical structure. A maximum of rotational acceleration and deceleration is realized around all axes by utilizing a generally spherical capsule, minimizing the number and complexity of moving parts, and generally centering the interior mass.

BRIEF DESCRIPTION OF THE DRAWINGS

FIG. 20 is an elevational view of a motion simulating device of the invention with high-frequency internal actuators.

DETAILED DESCRIPTION OF THE INVENTION

Figure 1:
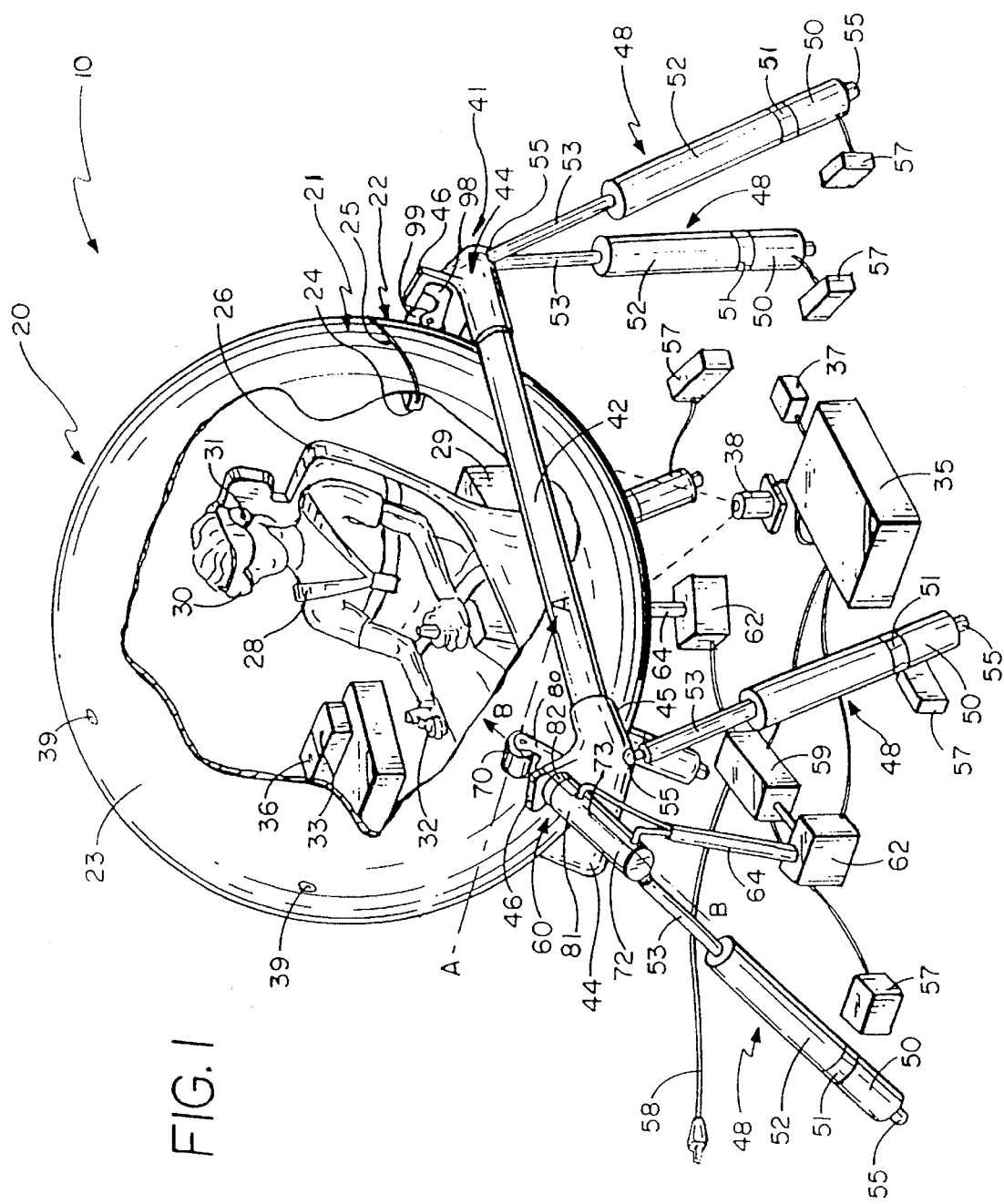
FIG. 1 is an elevational view of a motion simulating device in accordance with the invention.
Figure 2:
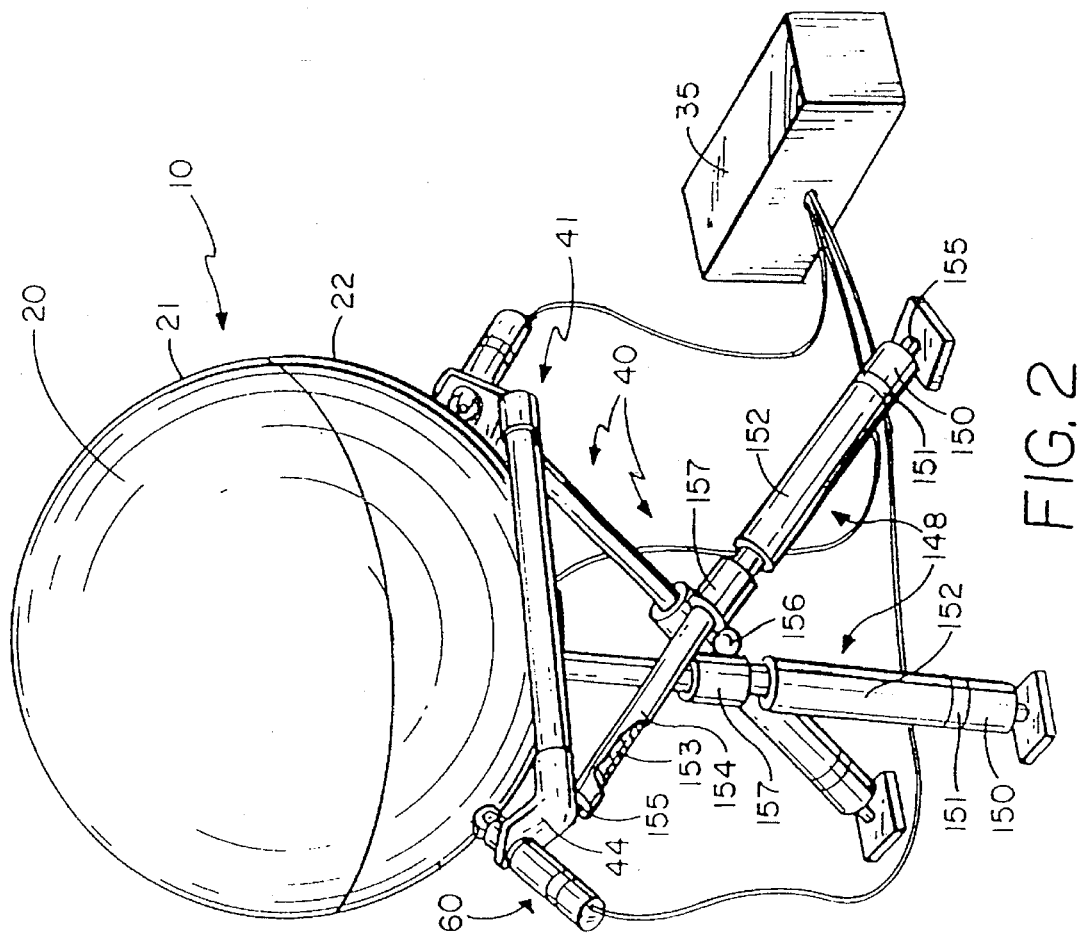
FIG. 2 is an elevational view of a motion simulating device in accordance with another embodiment of the invention.
Figure 3:
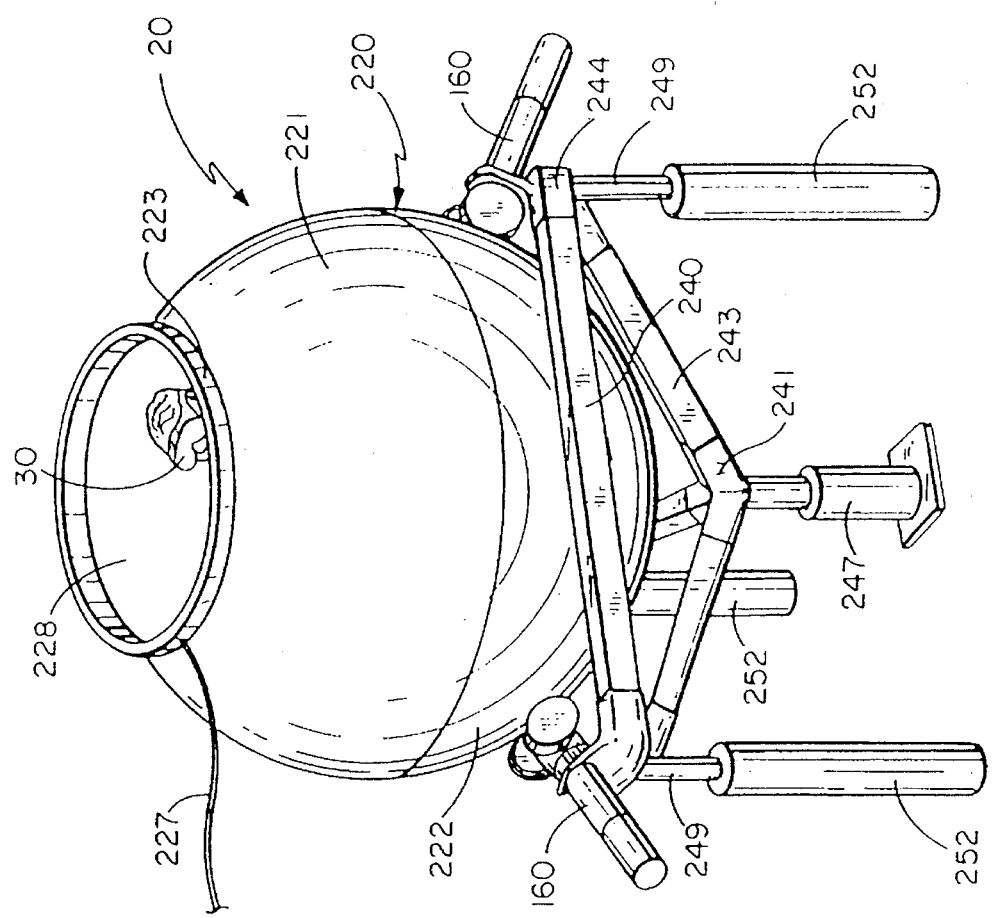
FIG. 3 is an elevational view of a third embodiment of the present motion simulating device.

A motion-simulating device (10) embodying the invention is illustrated in FIGS. 1–3. The device (10) comprises a generally spherical capsule (20) that rests on at least three rollers, with one or more active rollers (60) and, optionally, one or more passive rollers (99). These rollers are attached to a translatable frame (40).

In a preferred embodiment, a capsule is supportively abutted by three rollers of which two of the rollers are multi-directional active rollers. The rollers are then attached to a triangular platform which is linearly translatable along three orthogonal axes by six actuator legs. Each apex of the triangular platform is rotationally connected to two actuator legs and each of the actuator legs is rotationally connected on the other end to the ground. The visual and audio input, as well as the responsive output from the user, are then processed by computers which control the active rollers and actuator legs.

FIG. 1 shows a capsule (20) having an upper hemisphere (21) and a lower hemisphere (22). The upper hemisphere (21) and the lower hemisphere (22) may be hingedly connected at an internal hinge (24) and open along an equatorial contact line (25). The capsule (20) is fitted with a chair (26) and a set of full restraint harnesses (28). A user may receive visual input from a head-mounted visual display (30) and audio input from earphones (31) or speakers within the sphere (not shown). In an alternative embodiment, the visual input may be displayed upon the inner walls of the capsule (20).

When operating the virtual reality system, the user may control the motion of the frame (40) and the capsule (20) by a suitable controller. In the embodiment shown in the drawings, the controller may comprise two control sticks (32) with each control stick being capable of controlling three degrees of freedom, as detailed below.

The translatable frame (40) shown in FIG. 1 has three beams (42) which are rigidly connected to one another by connecting joints (44) at beam receptacles (45) to form a triangular platform (41). Each connecting joint (44) includes a mounting plate (46) for supporting either an active roller (60) or a passive roller (99). Each connecting joint (44) is supported by two actuator legs (48). The actuator legs (48) may each comprise a movable rod (53), a support housing (52), an actuating motor (50), and a gear reduction means (51). The movable rod (53) is driven by the actuating motor (50) so that the movable rod travels along the longitudinal axis of the support housing (52). The actuator legs (48) are attached to the connecting joints (44) and to the ground by rotatable connectors (55). By selectively and differentially moving the actuator legs (48), the triangular frame (41) can be translated along any of the three orthogonal axes. Such a construction is known to those skilled in the art as a Stuart platform. It is recognized that the movement of the triangular platform (41) may be effected by a variety of constructions of rigid members, flexible members, beatings, sliders, motors, and related motion system components.

The active rollers (60) and the passive rollers (99) are attached to the connecting joints (44) at the mounting plates (46). In a preferred embodiment, the capsule (20) is driven by two active rollers (60) about three orthogonal axes located at the center of the capsule (20), and a single passive roller (99) rests substantially upon a thrust bearing (98).

Each active roller (60) includes a drive wheel (70) that is attached to a rotating yoke (80). The drive wheel (70) is driven by a drive wheel motor (72) and a reduction means (73). The drive wheel (70) is rotatable about a drive axis "A—A" that is generally parallel to a tangent to the surface of the capsule (20). The drive wheel (70) frictionally engages the capsule (20) and causes the capsule (20) to rotate in a direction perpendicular to both the drive axis "A—A" and axis "B—B." The drive wheel (70) is rotatable about axis "B—B" by rotating the yoke (80). The yoke (80) is rotatably driven by the yoke motor (81) and a reduction means (82). In a preferred embodiment, the capsule (20) may be coated with a friction enhancing substance such as silicon carbide particles encapsulated by a spreadable liquid binder, or the surface may be roughened by a light sand blasting to enable faster rotational acceleration.

The active rollers (60) and the actuator legs (48) are controlled by an interactive virtual reality control system. The rotational position of the capsule (20) is measured, e.g., by a gyroscope (33), and the measurement, e.g., output from the gyroscope, is routed through an internal computer (34), which may be located inside the capsule (20). Once position information is processed by the internal computer (34), the data is optimally sent through a transmitter (36) to a receiver (37). The receiver (37) then sends the position data to the main computer (35), which may be located outside of the capsule (20).

The main computer (35) is also connected to the actuator motor controllers (57) and the active roller controllers (62). The actuator motor controllers (57) control the actuator legs (48). The active roller controllers (62) are connected to the active rollers (60) by a cable (64). The main computer (35) may also receive position data from the actuator legs (48) to determine the translational location of the platform (41).

While using the interactive virtual reality control system, a head-mounted display adjusts the images it displays in response to the user's movements. Data entry in the sphere for visual images, sound, and touch, can use a high-speed digital laser transmission system having a wide-beam transmitter (38) and a plurality of capsule receivers (39). Such capsule receivers (39) are evenly spaced on the outside of the capsule (20). The data entering the capsule (20) is processed by the internal computer (34) and then routed to the head-mounted visual display (30) and the earphones (31). An internal battery (29), which is rechargeable during periods of non-use and readily replaceable, powers the electrical system inside the capsule (20). A line voltage supply (58) connected to a power supply (59) provides the power for the electrical components located outside of the capsule (20).

FIG. 2 shows an alternative embodiment of the invention employing a different actuator leg system. The capsule (20) is supported by the active rollers (60) whose drive means are attached to the triangular platform (41) through the connecting joints (44). Linear actuation is achieved by placing the triangular platform (41) on top of a tripod comprised of three actuator legs (148). Every connecting joint (44) is supported by a single actuator leg (148). The actuator legs (148) may have the same structure as the legs (48) detailed above. Preferably, though, the legs (148) comprise a ball screw (153) (shown through cutaway), a supporting housing (152), an actuating motor (150), and a gear reduction means (151). Rotatable ball joints (155) attach the actuator legs (148) to the triangular platform (41) and to the ground. The actuator legs (148) are positioned relative to each other at their centers by a sliding fastener plate (156) through linear-rotational bearings (157). The ball screw (153) is held within a smooth-walled upper support cylinder (154) so that the linear rotational bearings (157) have a smooth and rigid surface upon which to travel.

As the actuator legs (148) change their lengths, the sliding fastener plate (156) passively seeks a position that keeps the tripod of actuator legs (148) rigid and stable. The tripod arrangement of actuator legs (148) as depicted in FIG. 2 will impart a known rotation about the vertical axis for any linear motion transmitted. Such rotation about the vertical axis may be negated by an equivalent counter-rotation of the capsule (20) itself. It is recognized that the movement of the triangular platform (41) may be effected by a variety of constructions of rigid members, flexible members, bearings, sliders, motors, and related motion system components.

In FIG. 3, a motion simulating device (210) having four degrees of freedom is depicted. The motion simulating device (210) retains full rotational motion, but linear motion is limited to up and down. In the embodiment shown in FIGS. 1 and 2, communication between the internal and man computers (24 and 35, respectively) is accomplished through the transmitter (36) and receiver (37). FIG. 3 illustrates a less expensive, though somewhat more cumbersome, system using a fixed cable. In this version, rotation around either horizontal axis is limited by the cable ring (223), which can serve as a movable means of attachment for a dedicated data exchange and a power cable (227). The motion simulating device (210) has a single translational mode which is along its vertical axis. The active rollers (160) rotate the capsule (220).

In the embodiment of FIG. 3, a user with a head-mounted visual display (30) is visible through an access port (228) in the upper hemisphere (221). A single actuator (227), attached to the ground at one end and an apex-connecting joint (241) at the other end, provides the single translational motion along the vertical axis. The apex-connecting joint (241) is connected by rigid supports (243) to the connecting joints (244). Stability is enhanced by rigid attachment of the sliding members (249) to the connecting joints (244). The sliding members (249) are free to move vertically, but are constrained in all other directions by housings (252) that are attached rigidly to the ground.

Figure 4:
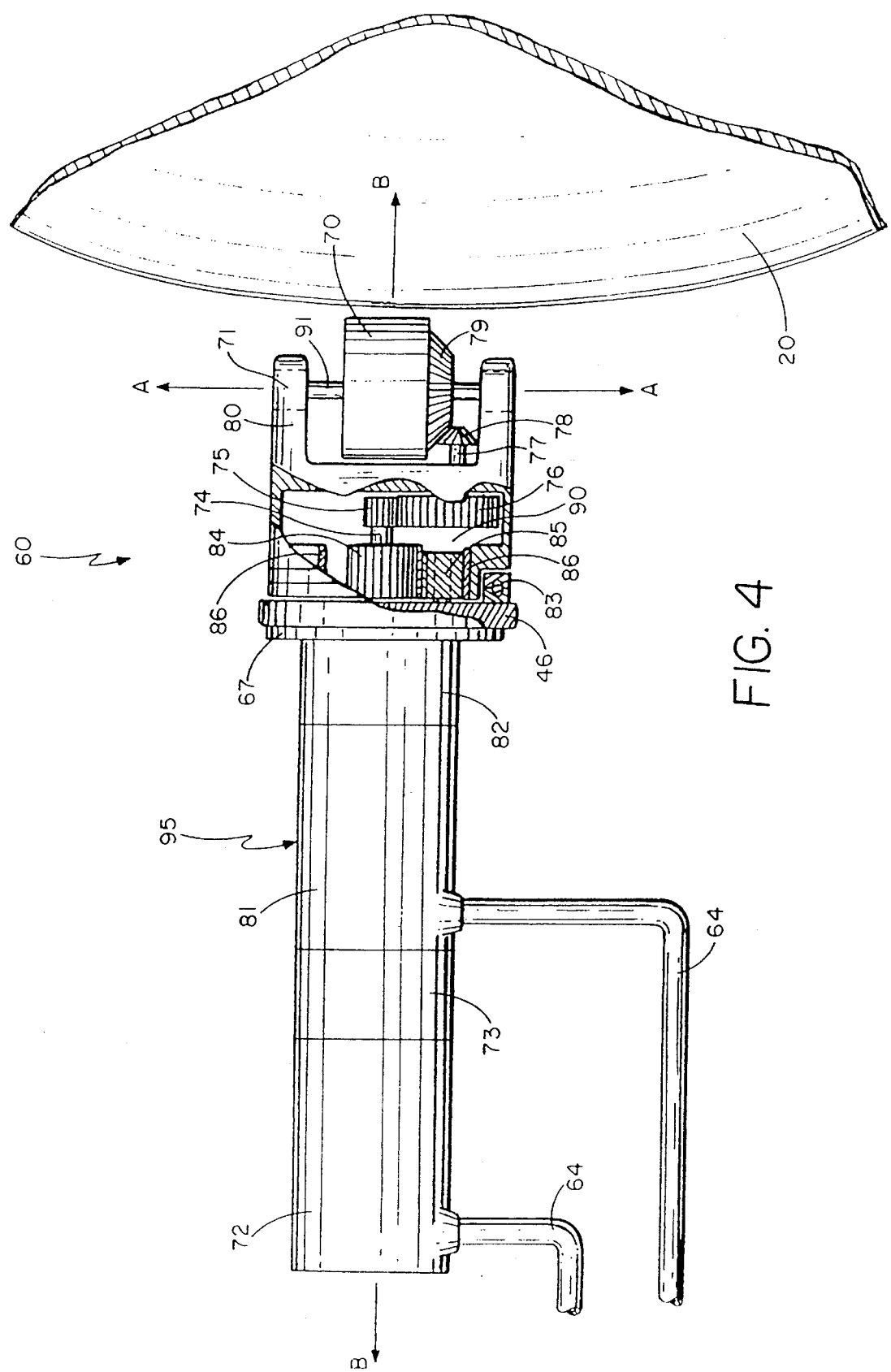
FIG. 4 is a cut-away view of an active roller for use in the invention.
Figure 5:
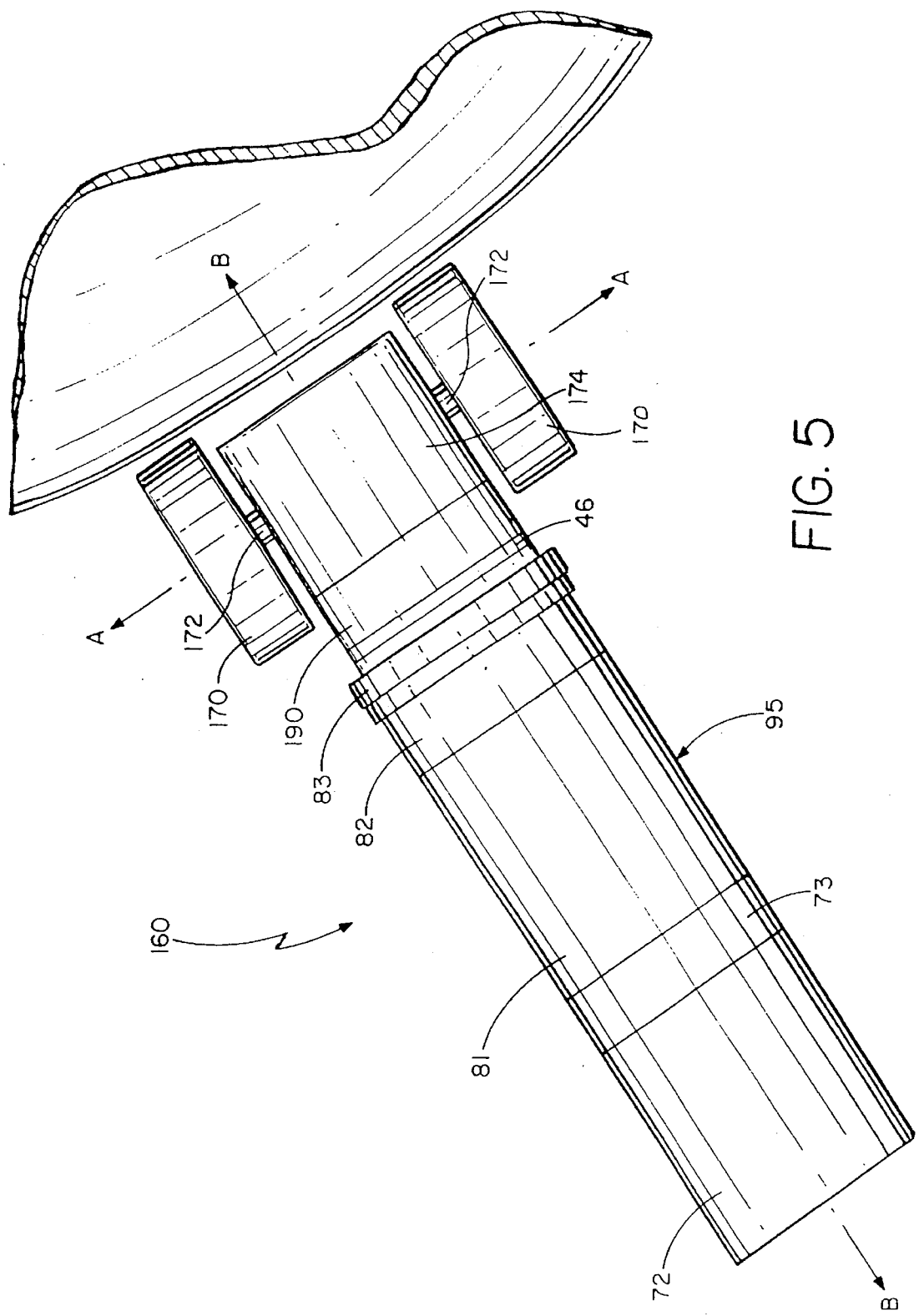
FIG. 5 is a top view of an alternative active roller in the invention.
Figure 6:
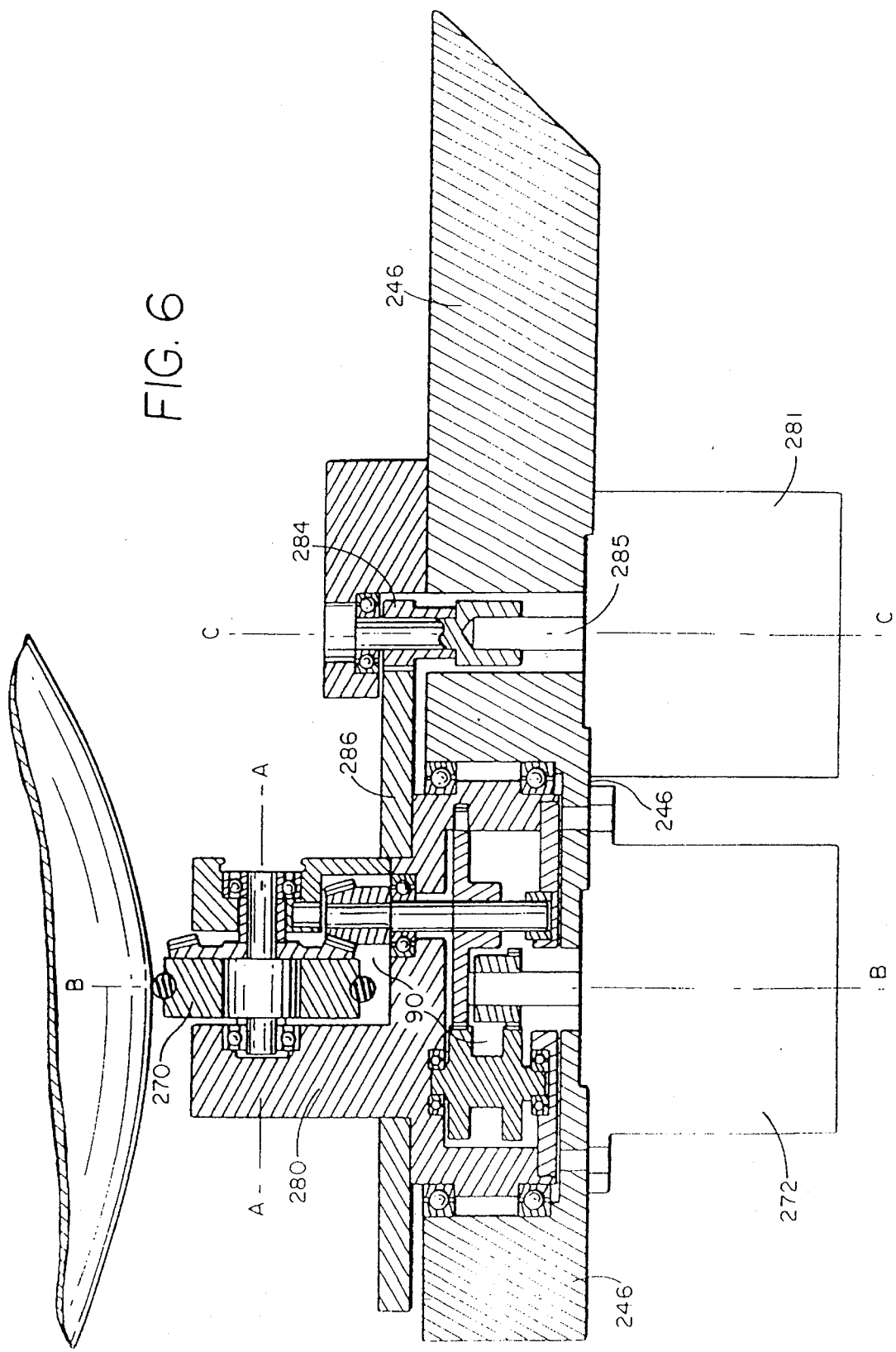
FIG. 6 is a cross-sectional view of another active drive roller in the invention.

FIGS. 4–6 show a variety of active roller embodiments. FIG. 4 depicts a plan view of an active roller (60) with a single drive wheel (70). The drive wheel (70) makes frictional contact with the surface of capsule (20). Rotation of the drive wheel (70) about the drive axis "A—A" rotates the capsule (20). Rotation of the drive wheel (70) about a perpendicular axis "B—B" changes the direction of the drive wheel (70). A yoke assembly (80) houses both the bearings (71) for the drive wheel (70), and the gear assembly (90) that actuates the drive wheel (70). A thrust bearing (83) supports the yoke (80) onto a mounting plate (46), wherein the mounting plate (46) is contiguous with a connecting joint (44) at the apexes of the triangular platform (41) as depicted in FIGS. 1–3.

The drive train for rotation about the "A—A" axis begins with a reversible drive wheel motor (72) and a drive wheel motor reduction means (73). An output shaft (74) is connected to the drive wheel motor reduction means (73), and may be coaxial with the control axis of the reversible yoke motor (81) and a reduction means (82). The output shaft (74) may emerge into the gear assembly (90) through the center of the yoke drive gear (84). The drive wheel drive gear (75) is rigidly connected to the output shaft (74) and engages a transfer gear (76). The transfer gear (76) may be connected by a drive shaft (77) through an intermediate bevel gear (78). The intermediate bevel gear (78) engages the drive wheel bevel gear (79) which rotates the drive wheel (70) about the drive axis "A—A."

The reversible yoke motor (81) rotates the yoke (80) and the drive wheel (70) about axis "B—B" through the reversible motor reduction means (82). The reversible yoke motor (81) and reduction means (82) may be substantially hollow along the central axis "B—B" to house the output shaft (74). Bidirectional torque output from the reduction means (82) drives the yoke drive gear (84). The yoke drive gear (84) engages a yoke idler gear (85). The yoke idler gear (85) engages teeth (86) which may be integral with the yoke (80), creating a torque that actuates rotation of the yoke (80) and the drive wheel (70) about the "B—B" axis.

The drive wheel motor (72), drive wheel motor reduction means (73), reversible yoke motor (81), and reduction means (82) may be rigidly and coaxially attached together. A face plate (67) mounts the motor/reducer assembly (95) to the mounting plate (46).

A number of electrical or optical cables (64) may connect the drive wheel motor (72) and the reversible yoke motor (81) with the power supply and also carry position information from angular encoders. This embodiment of an active roller (60) for a single roller about two perpendicular axes is advantageous because of the fixed position of the drive wheel motor (72) and the yoke motor (81). This fixed position allows use of a hard-wired cable harness rather than expensive and less reliable rolling or sliding electrical contacts.

FIG. 5 shows an alternative embodiment of the invention employing an active roller (160) which may have dual drive wheels (170). The two drive wheels (170) are driven by the output shafts (172). The output shafts (172) may engage an automotive type differential (174) which is connected to a gear assembly (190). A thrust bearing (83) directs loading against the mounting plate (46), which is formed as part of the connecting joints (44) as shown in FIG. 1. The motor/reducer assembly (95), as described for FIG. 4, is connected to the gear assembly (190), and works in the same manner as described in FIG. 4.

Using two drive wheels (170) for a single active roller (160) is more advantageous than using a single drive wheel (70) as shown in FIGS. 1, 2, and 4. First, the rotation of the two drive wheels (170) about their common center requires less energy input by the drive wheel motor (72) because the friction of rotation is reduced. Second, the typical curved path that the common center follows during actuation generates less friction and thus requires less energy input by the drive wheel motor (72). Third, the compressive loading at the contact points on the capsule (20) is half that of a single drive wheel (70) resulting in less wheel deformation of the capsule (20) and use of a thinner outer shell for the capsule (20).

FIG. 6 depicts another embodiment of the invention using a variation on the single drive wheel active roller system. In FIG. 6, a mounting plate (246) is integral to the connecting joint (44) as shown in FIG. 1 and rigidly supports both a reversible drive wheel motor (272) and a reversible motor (281). The drive wheel motor (272) and the reversible motor (281) may be mounted along two parallel but separate axis, "B—B" and "C—C". The drive wheel motor (272) may be connected to a gear assembly (290) so that the output from the drive wheel motor (272) rotates the drive wheel (270) about the drive axis "A—A". The drive wheel (270) is positioned about the "B—B" axis by the reversible motor (281). A spur gear (286) may be attached to the drive wheel housing (280) to the drive gear (284) which is connected to the output shaft (285) of reversible motor (281).

The invention preferably incorporates a vision system which the user views during motion. The vision system displays a scene on a monitor or a head mounted display wherein the viewed motion responds according to the motion of the user's vision. When using a head-mounted display, the display should shift when the user's head turns or tilts so that the user's experience parallels that of turning or tilting his or her head when viewing a real environment. For example, the displayed horizon will shift upwardly in the display when the viewer tilts his or her head downwardly. Position sensing is critical to coordinating vision with motion and the user's sense of real gravity. Consequently, both the position of the user's field of vision and the position of the capsule (20) itself are important in the present invention.

Position sensing may be accomplished by a variety of means. Rotational position may be sensed by a gyroscope mounted within the sphere, or by electrical coils interacting through electromagnetic induction. Linear position may be sensed by linear potentiometers, linear variable differential transformers, or magnetostrictive sensors mounted inside the actuator legs (48). Such systems are well known and well characterized by those in the art of motion sensing and control.

Motion control of the system may be either closed looped or open looped. A closed loop system senses the action being controlled and sends position information back to a controller so that the controller can minimize the error between the actual performance and the desired performance. An open loop system, however, does not send any position information back to the controller, and as a result, an open loop system does not automatically correct the error between the actual performance and the desired performance. Closed-loop motion control is preferred because it is more accurate. Both closed-loop and open-loop motion controls are established science, and a variety of theoretical and practical means are available for their implementation.

A preferred embodiment of the vision system may be a head-mounted display that sends separate images to each eye. Such a system creates a true three dimensional effect. Rotational motion on all three axes with respect to the ground is sensed at the user's head. Consequently, the user may tip his head and see a tilting landscape without causing the system to move. One such head-mounted display adaptable for use with the invention is the Eyephone HRX from VPL Research, Inc.

Another form of a virtual reality system useful with the present invention could include sound along with motion and vision. In a preferred embodiment, the sound system utilizes directional sound generation. Directional sound generation would allow the user's ears to perceive sound from different locations giving an indication of direction. One such system, the Convolvotron, has been dually developed by NASA's Ames Research Center and Crystal River Engineering, of Groveland, Calif.

The generally spherical capsule (20) is desirably free to fully rotate around the three orthogonal axes located at the center, the capsule has no direct physical contact with any external elements. Sliding contacts or hardwire cables are not particularly feasible in the embodiments depicted in FIGS. 1 and 2 because the data cable (227) shown in FIG. 3, for example, would interfere with the frame (40) as the sphere is rotated through certain angles or in certain directions. For example, if the user were to induce motions which would turn him or her upside down, such as in a simulated roll of an airplane, the cable system illustrated in FIG. 3 would tend to abut against the frame or the rollers. Consequently, data in the embodiments of FIGS. 1 and 2 must be exchanged between the capsule (20) and the external environment by electromagnetic means, as mentioned briefly above.

One such electromagnetic means may be a combination of multi-spectral digital laser pulses sending information into the capsule (20), and UHF radio signals sending information out of the capsule (20). For this communication configuration, a laser sending digital pulses aims its beam toward the capsule (20). A beam spreader widens the laser beam so that it projects the signal into a circular area called the "data circle." Laser-sensitive receivers (not shown) may be spaced evenly over the surface of the capsule (20) so that at least one receiver is within the data circle at any time. If necessary, these receivers may be flush with the rest of the surface of the capsule or be recess-mounted in the surface to avoid any unwanted effects from contact with the rollers supporting and driving the capsule.

Inductive means, such as two wire coils, may be used to provide power inside the capsule (20), where direct connection of power is not feasible. Alternatively, quick-charge or replaceable batteries may be employed within the capsule (20).

In addition to the sensations of sight, sound, and movement, the instant invention may also operate on the basis of the user's sense of touch by using interactive solids. Interactive solids for use with the invention are contemplated as being either "passive" or "active". As used herein, the term "passive interactive solid" refers to a solid or semi-solid object which remains substantially stationary or is under the direct physical control of the user, while the term "active interactive solid" is used to refer to a solid or semi-solid object which can be moved by the virtual reality system in coordination with the electronic simulation of physical reality and physical input from the user.

Passive interactive solids are not connected to the interactive control means, and as such, move (if at all) only when physically acted upon by the user. Passive interactive solids may be used to impart the physical sensations of touch in fixed environments or corporeal objects that may be simulated by inanimate objects.

For instance, a passive interactive solid may comprise a mock-up of a control panel which remains fixed within the capsule regardless of the movements of the user or, in the case of simulated switches and the like, will move only when the user reaches out and physically moves the switch. Active interactive solids, in contrast, are moved within the capsule under the control of the virtual reality system and may take the form of a solid representing a wall which moves within the capsule as the user "moves" within the virtual environment. In an alternative embodiment having application in the emerging field of so-called "virtual sex," the visual images displayed for the user may be explicitly sexual in nature and the active interactive solids may be solids or semi-solids which represent an interactive partner in the "virtual sex" environment.

Figure 7:
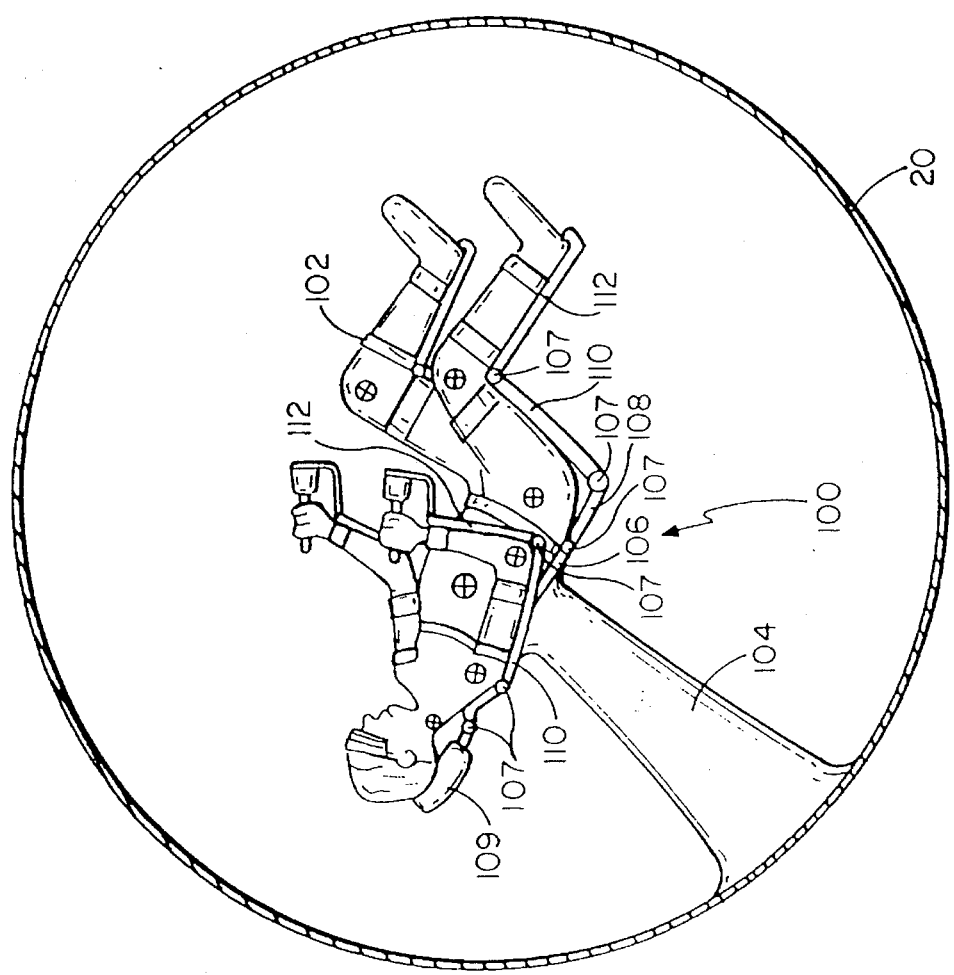
FIG. 7 is a perspective view of an interactive support apparatus in accordance with the invention wherein the user is in a reclining position.
Figure 8:
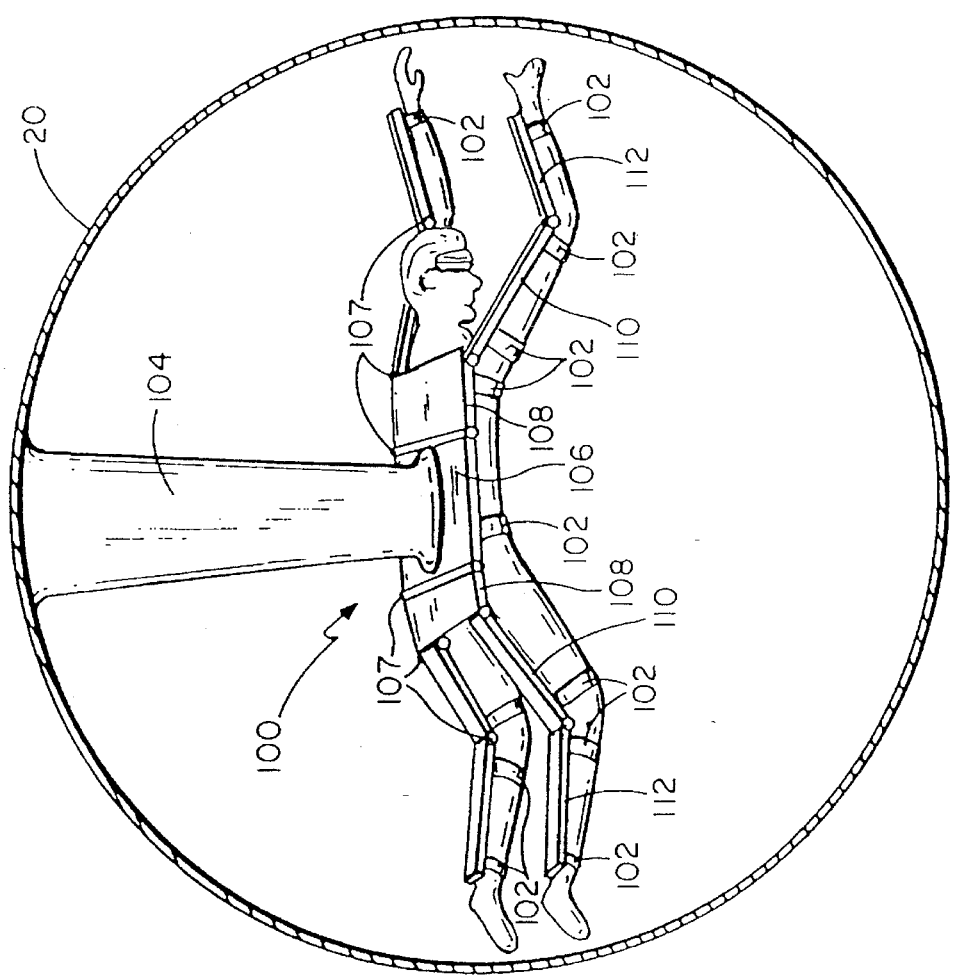
FIG. 8 is a perspective view of an alternative interactive support apparatus, where the user is in a suspended position.

FIGS. 7–8 show an interactive support apparatus (100) which is a type of active interactive solid. In the present invention, the interactive support and apparatus (100) is a self actuated solid that moves in coordination with the virtual vision depicted on the head-mounted visual display (30) and in response to the physical contact of the user. The interactive support apparatus (100) may include a support arm (104) that is attached to the capsule (20). A back plate (106) may be connected to the support arm (104) and hingedly attached to abdominal support plates (108) by motorized hinges (107). Each abdominal support plate (108) may be attached to two first limb support plates (110), and each first limb support plates (110) may be attached to a single second limb support plate (112). The motorized hinges (107) may connect the abdominal support plates (108), first limb support plates (110), and second limb support plates (112), so that the user is sufficiently supported along all parts of his or her body.

Upon entering the capsule (20), the user may simply recline in the interactive support apparatus (100) and be strapped into place by the restraints (102) as shown in FIG. 7. The restraints (102) are preferably placed near major body joints. The user will preferably be further secured to the interactive support apparatus (100) by a shoulder harness and groin straps (not shown). The restraints (102) may be velcro straps, mechanically actuated rigid clamps, or any other suitable device.

The interactive support apparatus (100) ensures that the user is supported in a manner appropriate to both the actual physical environment and the manufactured virtual environment. While reclining, for example, a user is supported from beneath. An arm attached to first and second limb support plates (110 and 112, respectively) will be allowed to move freely above the virtual surface of reclination. Once the arm attempts to move through the surface of reclination, however, the support plates become rigid and the user's arm is prevented from passing through the virtual surface. In another example, a user may be suspended beneath the interactive support apparatus (100) and the first and second limb support plates may provide the sensation of moving a wing through the air as the user experiences flying like a bird in virtual space.

Figure 9:
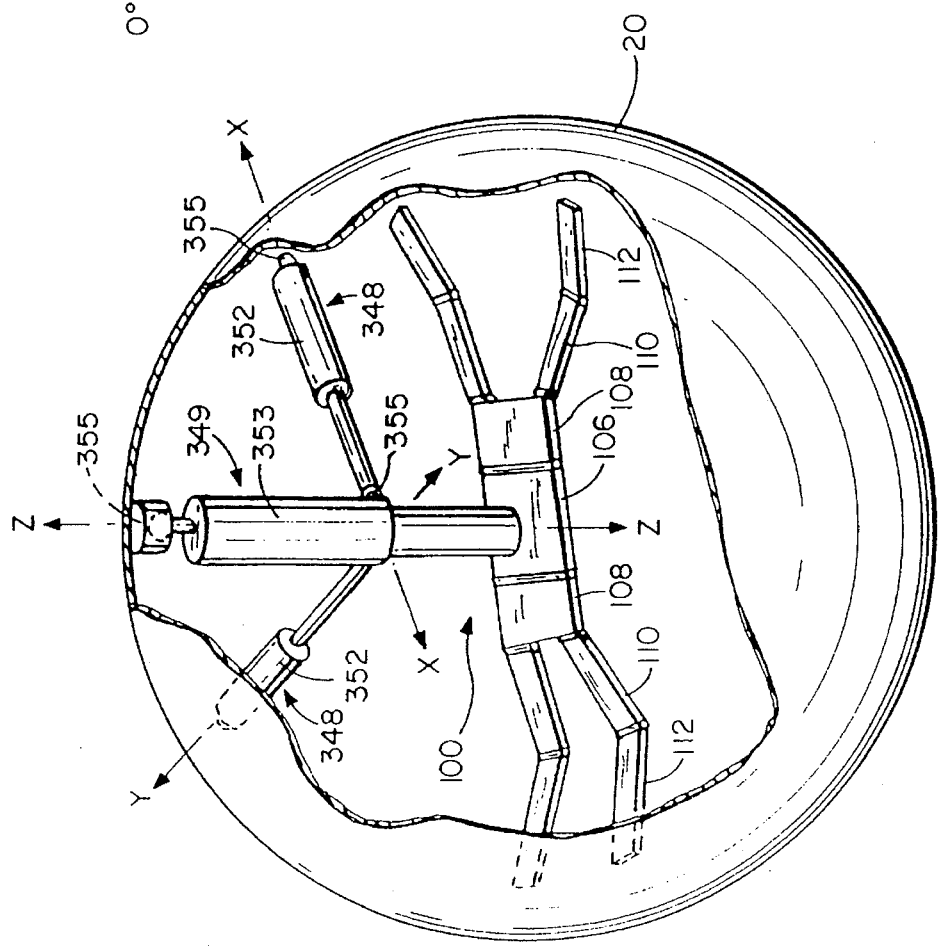
FIG. 9 is a perspective view of yet another interactive support apparatus which includes translational means.

FIG. 9 depicts an alternative embodiment of an interactive support apparatus (100) which is capable of moving along three orthogonal axes within the capsule (20). In FIG. 9, the actuator arms (348) and translatable support arm (349) may all be connected on one end to the capsule (20) by rotatable connectors (355). The actuator arms (348) may be connected on the other end to the housing (353) of the translatable support arm (349) by rotatable connectors (355). The translatable support arm (349) may then be securely connected to back plate (106).

The actuator arms (348) and the translatable support arm (349) are depicted as cylinders that may be powered, for example, hydraulically, pneumatically, or electrically as ball-screw type actuators. Additionally, the actuator arms (348) and the translatable support arm (349) may be arranged as a tripod. One advantage to providing translation back and forth along three orthogonal axes within the capsule (20) rather than by moving the frame (40) as shown in FIG. 1 is that the components required for translational motion within the capsule (20) are smaller in size and do not require as much power. Moreover, the size of the capsule (20) will only need to be increased a nominal amount.

Figure 10:
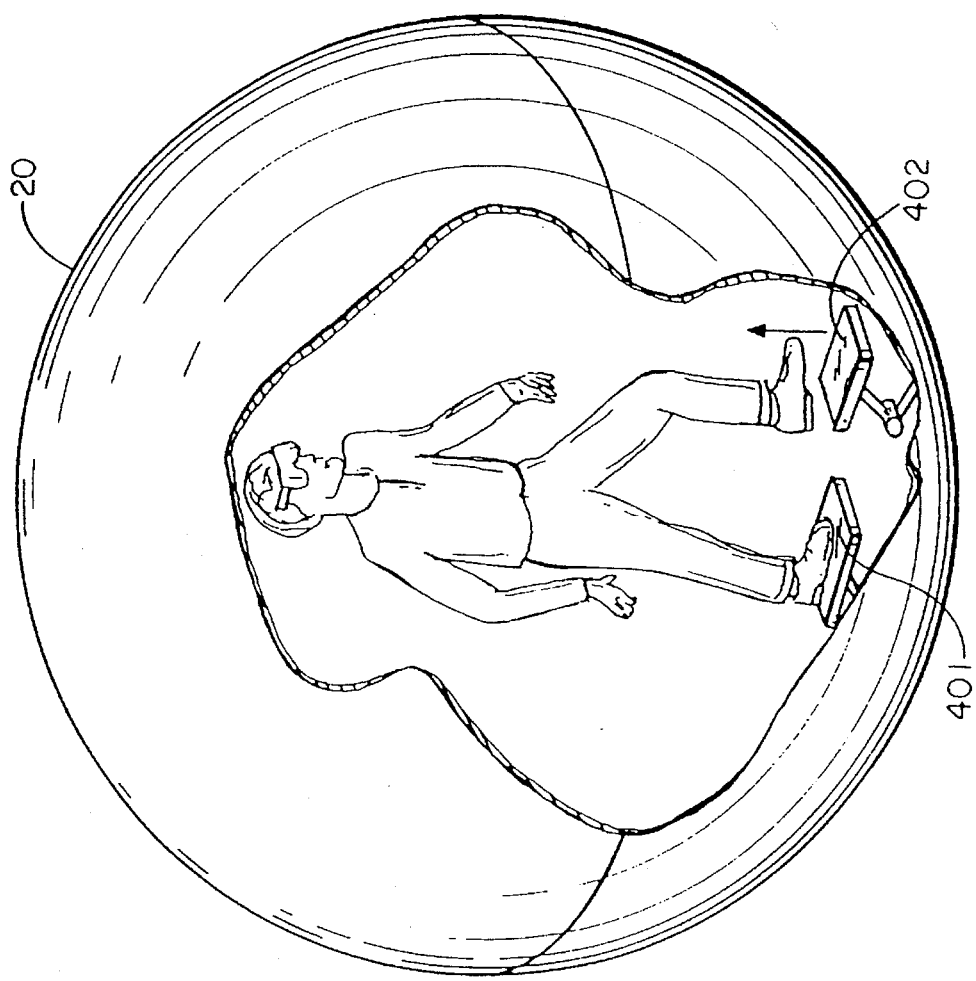
FIG. 10 is a cut-away view of a motion simulating device with interactive solids of the invention.
Figure 11:
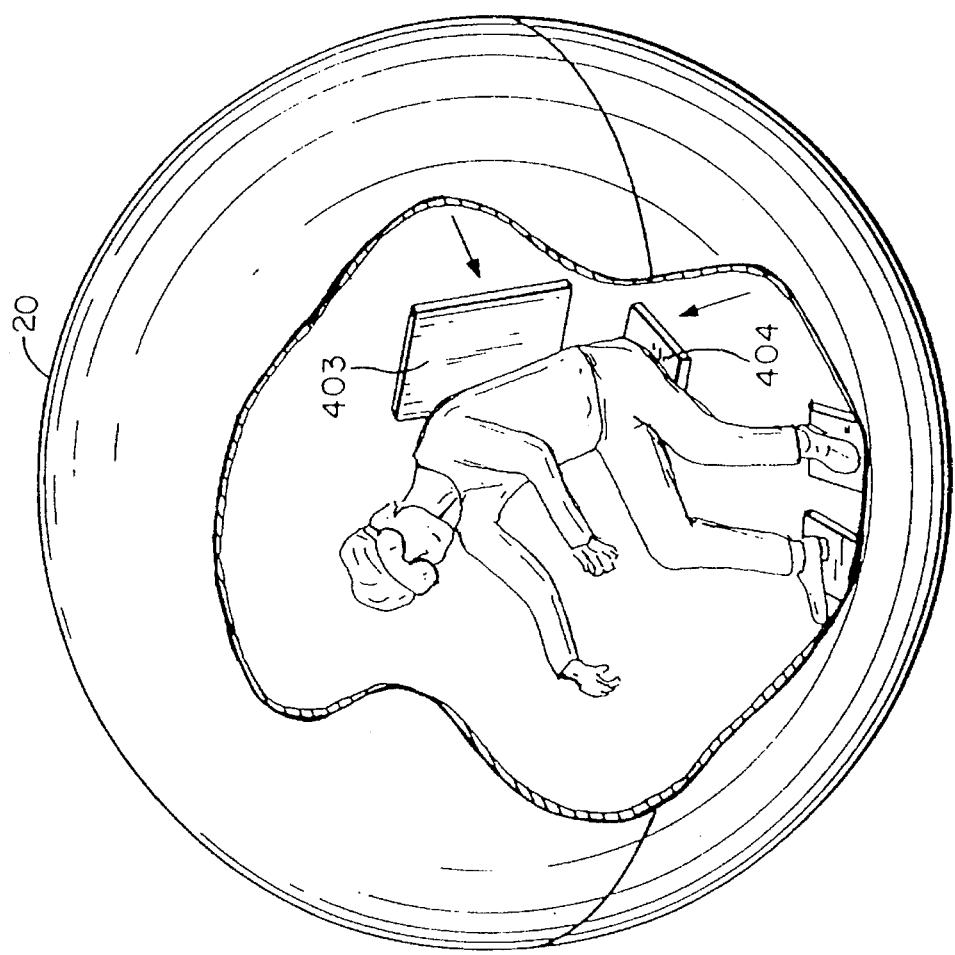
FIG. 11 is a cut-away view of a motion simulating device with interactive solids in accordance with another embodiment.

FIG. 10 depicts another type of active interactive solid for simulating walking. As the user's feet rise up and down, either a first platform (401) or a second platform (402) rise or fall to meet each step. Similarly, FIG. 11 depicts an active interactive chair. A seat platform (404) may move into position to act as a seat while a back platform (403) may move into position to act as a back. The active interactive solids depicted in FIGS. 10–11 allow a user to alternatively walk and sit upon a solid support while staying within the environment of the capsule (20).

Figure 12:
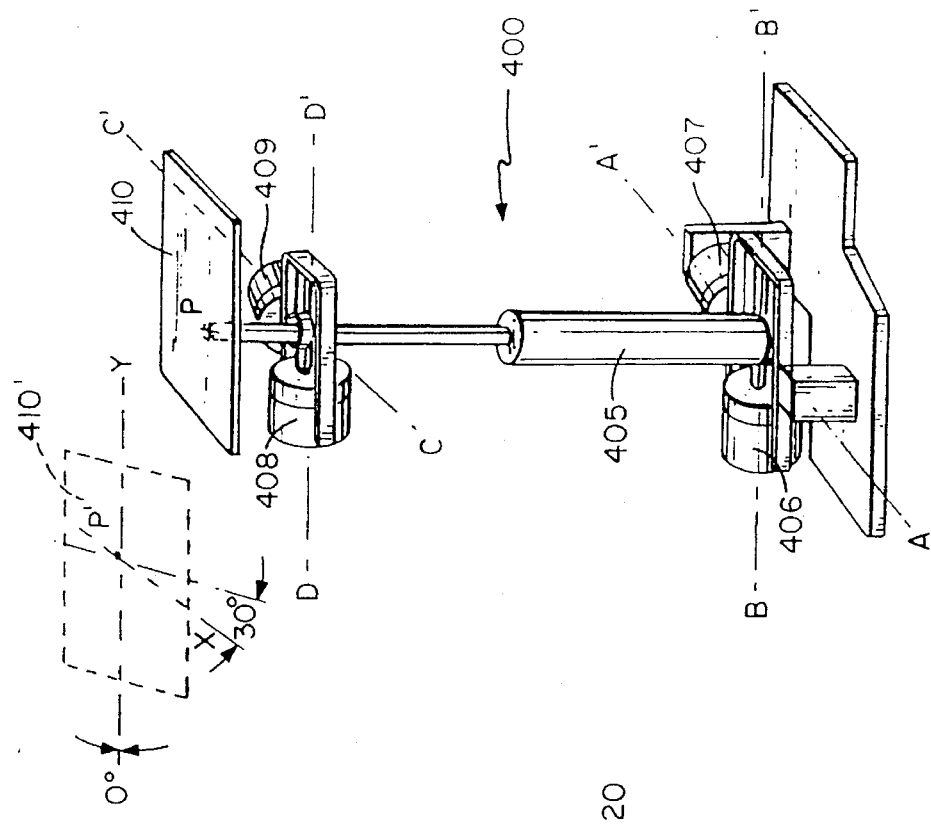
FIG. 12 is an elevational view of an interactive solid for stepping.

FIG. 12 shows an interactive step (400) which moves with respect to the inner surface of the capsule (20). The interactive step (400) is also an active interactive solid. A linear actuator (405) may be mounted on two rotatable axis, "A—A" and "B—B". A foot pad (410) may be connected to the upper end of the linear actuator (405) and may be rotatable around axis "C—C" and "D—D". A first lower stepper motor (407) causes rotation about the "A—A" axis. Similarly, the second lower stepper motor (406) causes rotation about the "B—B" axis, the first upper stepper motor (409) causes rotation about the "C—C" axis, and the second upper stepper motor (408) causes rotation about the "D—D" axis.

In the virtual reality environment, the interactive step (400) may simulate stepping up a pathway by first using the lower stepper motors (407) and (406) to orientate the linear actuator (405) in the correct direction, and then the upper stepper motors (408) and (409) rotate the angle of the foot pad (410) to match the inclination of the expected terrain.

It is understood that a rotation about axis "A—A", "B—B", "C—C", and "D—D" may be accomplished by a variety of positioning means known to those skilled in the art of motion control. For example, any of the stepper motors may be replaced by a servo motor, plain DC motor, AC motor, hydraulic motor, pneumatic motor, or even a linear actuator. The linear actuator may be driven by hydraulics, pneumatics, or electrically. Alternatively, the foot pad (410) may be placed at the end of a two-part linkage with each joint angle precisely controlled as depicted in FIG. 10.

Figure 13:
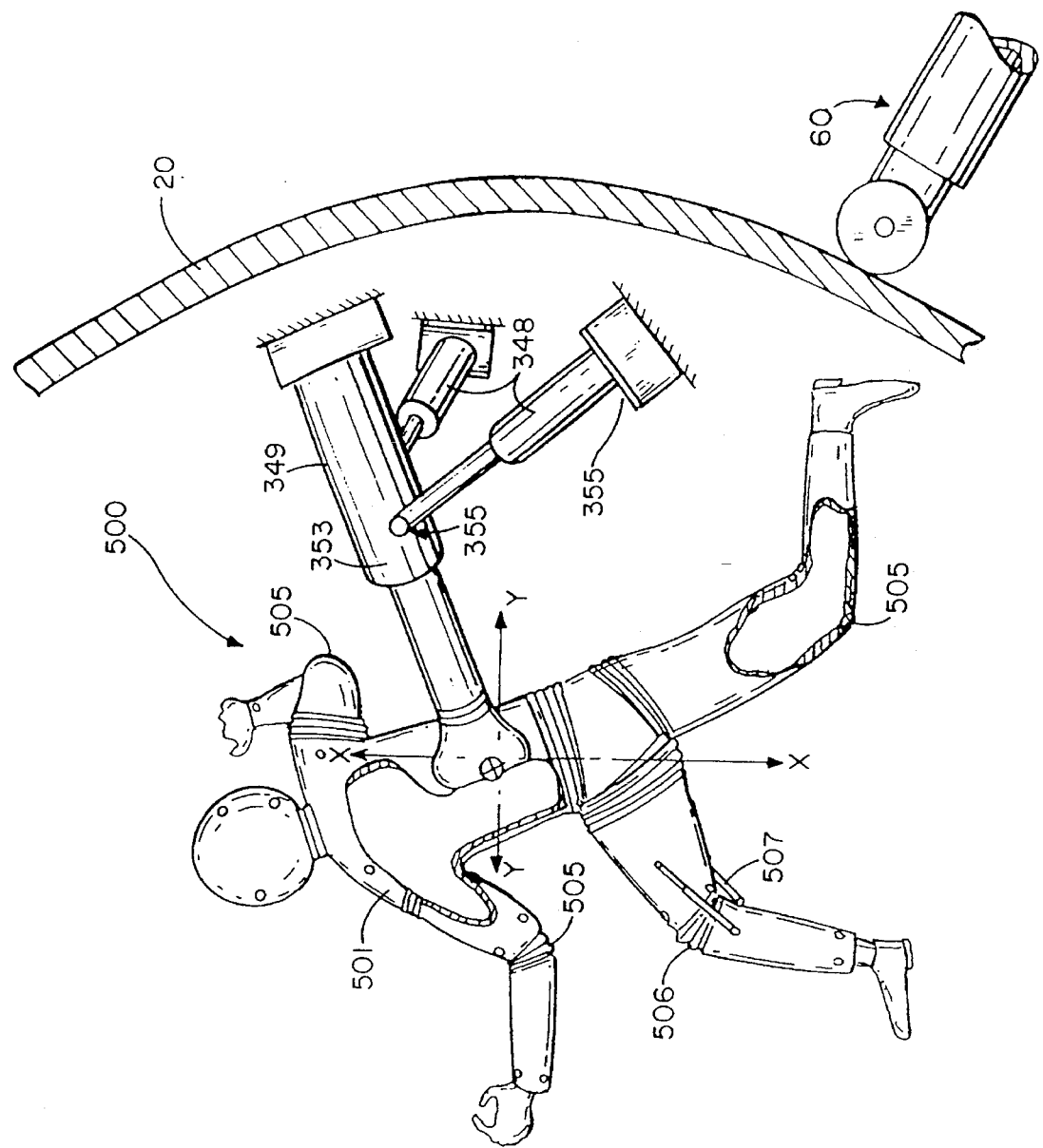
FIG. 13 is an elevational view of an interactive support apparatus coupled to an interactive pneumatic support suit.

FIG. 13 shows another type of active interactive solid, an interactive fluidic support apparatus (500). The fluidic support suit may use either a gas or a liquid as the support medium. A pneumatic support suit (501) may support a user in a suspended state and uses a gas as the support medium. A buoyancy suit (not shown) may use a liquid as the support medium. In a pneumatic support suit, the joints (505) may be mechanically actuated to respond to the user's positioning requirements. For clarity, FIG. 13 omits depiction of the actuator means at the joints (505), except as shown by the dual push/pull pistons at the left knee joint (506). A linear actuator (507) may position the user's body in response to the user's positioning requirements.

The pneumatic support suit (501) may be attached to one end of the translatable support arm (349) and the other end of the translatable support arm (349) may then be attached to the capsule (20). Two additional actuator arms (348) may be attached to the translatable support arm (349) by rotatable connectors (355) at the housing (353).

Figure 14:
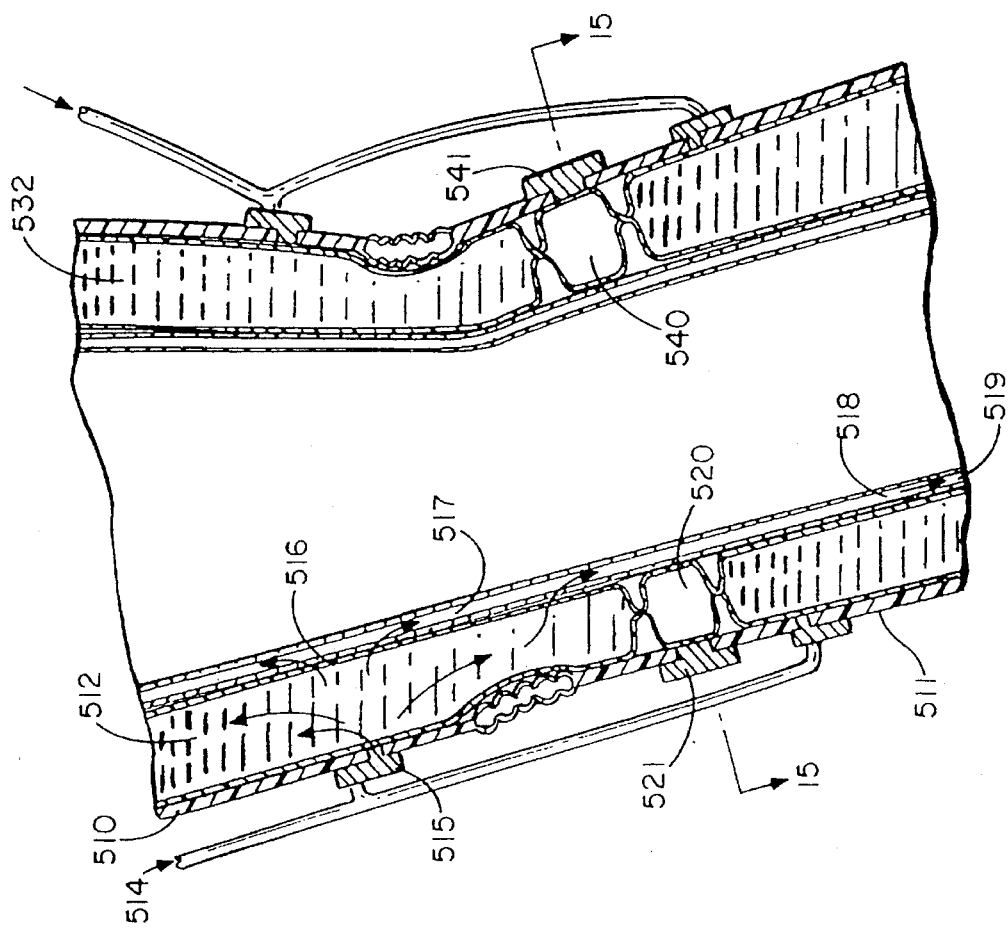
FIG. 14 is a cut-away view of the interactive pneumatic support suit of FIG. 13.

The cross section of the pneumatic support suit (501) shown in FIG. 13 medium is shown in FIG. 14. The pneumatic support suit (501) may use a rigid shell (510). An air bladder (512) may be placed immediately adjacent to the rigid shell (510) on one side and a semipermeable layer of material (517) on the user's side. A semirigid porus layer (518) may then be disposed between surface of the user and the semipermeable layer (517). Air input from a high pressure supply (514) may be regulated by the control valve (515) with integral pressure sensing. As the air enters through the control valve (515), it inflates the bladder (512) to provide support to the user. The air then passes through the semipermeable layer (517) and into the highly porus region (518) where it may then be exhausted out of the system along the exhaust path (519). The TiNi Alloy Company in San Leandro, Calif., manufactures a valve suitable for use as the valve on this application.

Relative and absolute positions of key external points of the pneumatic support suit such as the head, joints, feet, and center of gravity, may be calculated by kinematic means well known to those skilled in the art. Additional position information may be obtained by optical or sonic means.

Figure 15:
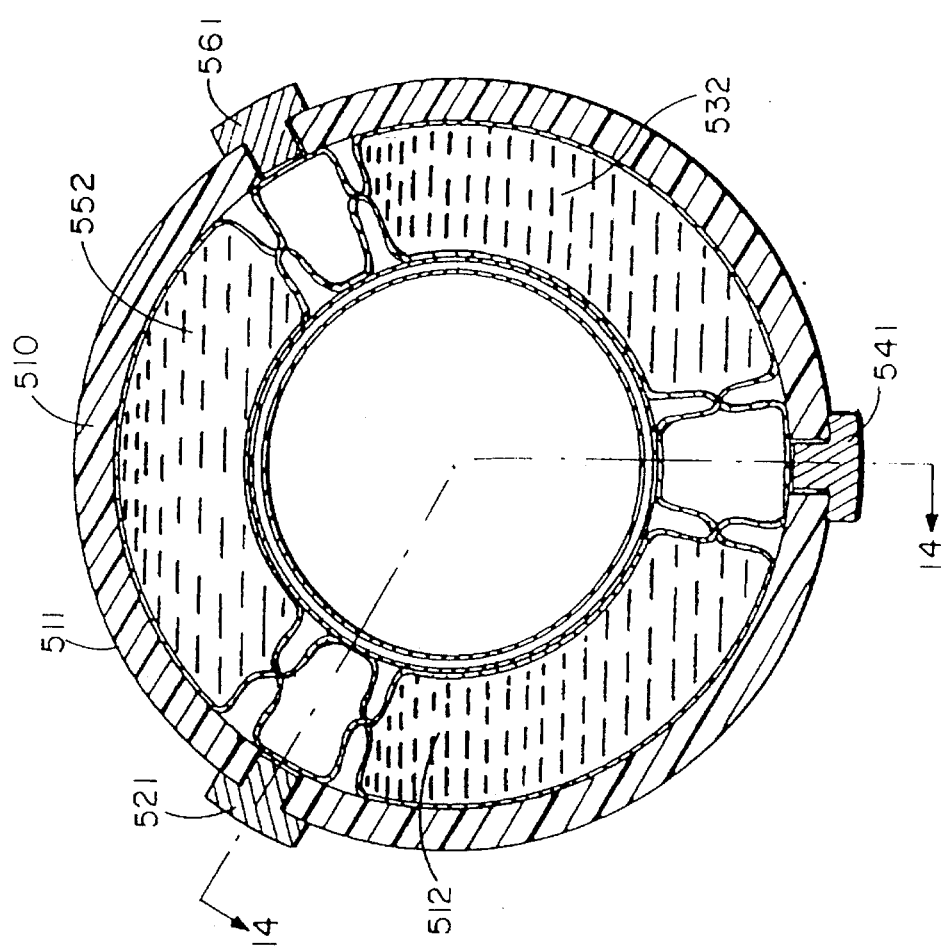
FIG. 15 is a cross-sectional view of a section of the interactive pneumatic support suit of FIG. 13.

The air pressure in bladder (512) varies according to the position of the user with respect to the bladder (512). Position of the user may be sensed using a sealed chamber (520) which encloses a pressure sensor (521). FIG. 15 shows a cross section of sensor location of the pneumatic support suit shown in FIGS. 13 and 14, with three pressure sensors a first sensor (521), second sensor (541), and third sensor (561). With the sensors spaced evenly at 120°, the position of the user's body may be determined continuously and accurately. If a supported segment of the user's body tends to go over to one wall of the suit and away from the other, one pressure sensing bladder is compressed while the other expands. For example, as pressure in the first bladder (512) increases, pressure in either the second bladder (532) or third bladder (552) may decrease giving direct indication of the position of the user within the rigid shell (510).

Typically, the first sensor (521), second sensor (541), and third sensor (561) may be of the micro-machined solid state type available from a number of manufacturers. The invention permits attachment of the valves (515) and sensors (521) to the rigid shell (510) along the surface (511). In the preferred configuration, at least three sensors may be mounted near every joint (505).

In the present invention, an advantage of an interactive pneumatic support suit (501) with controlled joint action is that the suit can be actively employed to create the sensation of virtual solids. To create a virtual solid, pneumatic support suit (501) will allow motion up to, but not through the space occupied by a virtual solid. For example, contact with a solid such as a wall will cause the pneumatic support suit to lock up so the user cannot push beyond the virtual plane of the wall, creating the sensation of a solid wall in a particular location. Similarly, the user may experience virtual flying like a bird by having the rigid shell (510) of the pneumatic support suit move and vary the air pressure in the bladders to transfer the force of the rigid shell to the user to create the perception of drag and lift against a wing.

The interactive solids require a position sensing system for providing the correct position in coordination with the virtual environment depicted on the head-mounted visual display (30). One example of position sensing system is described above in the description of the pneumatic support suit (501). Another example of a position sensing system within the capsule (20) requires a combination of transmitters and receivers, where a number of receivers evenly spaced along the inside surface of the capsule (20) sense the position of a number of transmitters that are attached to various points of a user.

The transmitter and receivers used in the position sensing system are well known to those skilled in the art. For example, Logitech, Inc. uses an ultrasonic technique for determining position in their 2D/6D Mouse. As another example, one could use a magnetic position sensor such as that marketed under the name "Flock of Birds" by Ascension Technology Corp. of Burlington, Vt. The Flock of Birds system may be of limited use if power is supplied to the capsule by inductive means, as noted above. Also, the PLADAR (Pulsed Light Angle Direction Tracking And Range) tracking system by David Fenner of the United Kingdom uses LED transmitter-receiver couplings.

Using the PLADAR system, transmitters may be positioned at points on a user's body. Three receivers, having an open line of sight to each sensor, then accurately determine the point in space of each receiver by triangulating the relative signal strength between the emitter-receiver pairs as an indication of distance between the pairs. Consequently, the position of each transmitter may be determined and then processed to determine the position of the corresponding body part of a user. The active interactive solids can respond to a user's requirements for support, suspension, or free movement, by combining force sensing on the active interactive solid acting against a user and the position of the user's body parts as determined by a sensing system such as the PLADAR light-based system.

A sense of touch may also be achieved by taking advantage of the fixed nature of certain virtual experiences. Interchangeable passive interactive solids may be used to tailor the environment inside the capsule (20) to conform to a specific virtual experience. In the present invention, passive interactive solids have no means of self-actuation. Passive interactive solids are generally pre-formed shapes whose contours match those of the virtual environment, and may be installed or removed quickly. Toggle-clamps or the like may be used to speed installation of a complete passive interactive solid environment.

One example of passive interactive solids involves a "mock-up" the interior of an aircraft cockpit. In a cockpit, a pilot views the components of the cockpit's interior as fixed with respect to his position while the sky and earth appear to be moving. Pre-formed shapes whose contours match those of the virtual cockpit can be installed within the capsule (20) so that a user can press real buttons, grip a real control stick, and otherwise press against real solid surfaces corresponding to specific objects displayed in the virtual environment. Specific detail such as control gauges which respond to the actions of the user may be added virtually through the vision system.

Figure 16:
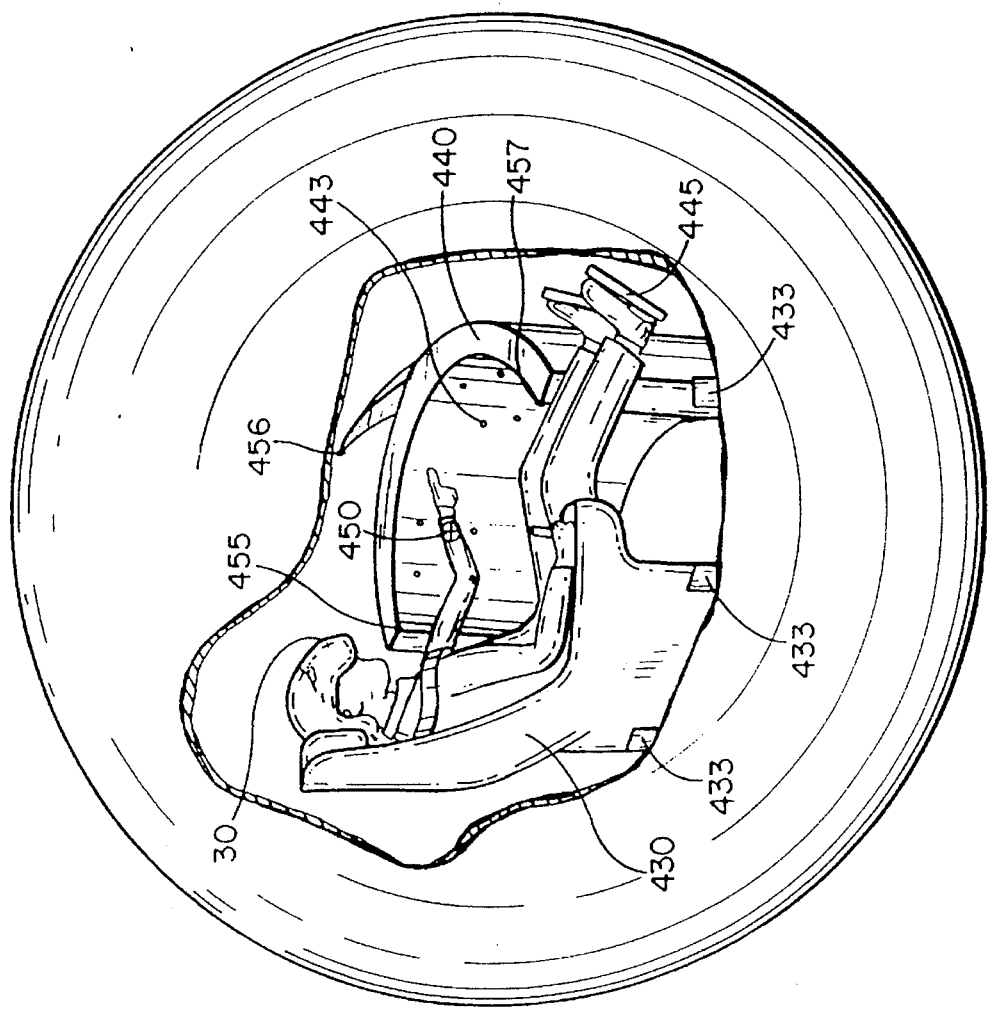
FIG. 16 is a partially broken-away schematic view of a motion simulating device of the invention including passive interactive solids.

FIG. 16 depicts one embodiment of a virtual environment including passive interactive solids. The user may recline in a fixed chair (430) which may be fastened to the inner surface of the capsule (20) by clamps (433). A control panel (440) may house a number of switches (443) which give an indication of being pressed. The control panel (440) does not house any dials or gauges, as those are represented visually through the head-mounted display (30).

By using passive interactive solids, the "reality" that the user experiences includes all of the elements of a fighter cockpit, for example, either through actual solid objects or virtual representations through the head mounted display (30). The passive interactive solids will allow the user to accurately sense pressing buttons and flipping switches and the like, and the system may respond as though the user is pressing real buttons.

An alternative or additional approach to interacting with passive interactive solids includes a sensing system for sensing the position of the user's lower arm and hand. Such a sensing system uses either light or ultrasonics, and may include an emitter (450) positioned near the users hand and a number of detectors positioned on the control panel (440) as shown by three detectors (455), (456) and (457). Position information may then be accurately determined and an image of the user's hand and arm can be coordinated into the image projected in the head mounted display (30). For example, a user will see his or her hand moving toward the control panel (440) and activating switches (443) when such a sensing system is employed.

Passive interactive solids are not limited to objects that define a fixed environment such as chairs and control panels. Passive interactive solids also include inanimate devices that passively simulate living beings such animals or humans. For example, a passive interactive dog may be used to impart the sensation of touch as a user pets a virtual dog, or a passive interactive human may be used to impart the sensation of physical contact. Of course, such objects could also be made as active interactive solids so that the dog or the partner move independently of direct physical contact with the user.

Figure 17:
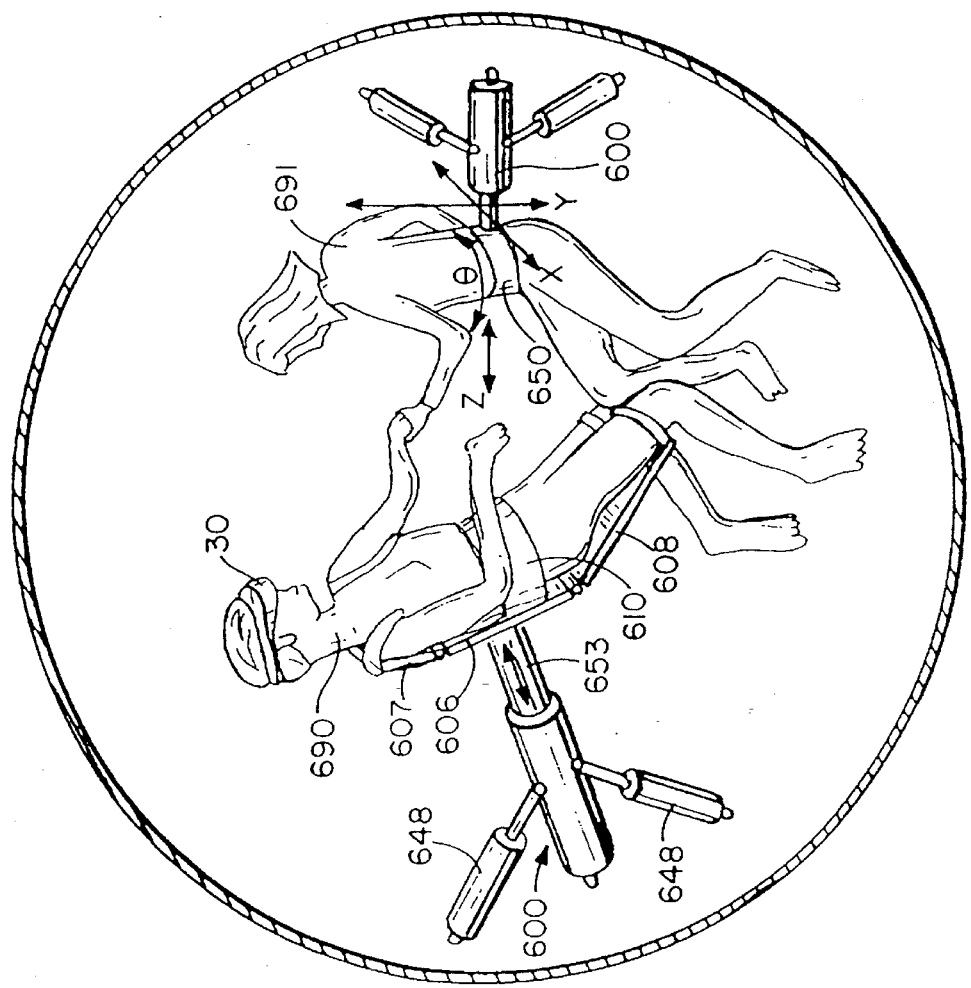
FIG. 17 is an elevational view of an interactive solid in accordance with another embodiment of the invention.

FIG. 17 depicts an alternative embodiment of a virtual system of the invention including a generally human-shaped interactive solid (691) simulating a human partner. The user (690) may wear a head-mounted display which displays the position and motion of the interactive solid (691) in virtual space exactly as the interactive solid is positioned in real space. This embodiment may be used for a variety of purposes, such as in teaching dancing lessons in a virtual reality environment, simulating wrestling, or in "virtual sex" applications.

The imagery corresponding to the interactive solid (691) may be completely generated by a computer; and as a result, the user (690) will have sole control over the virtual interaction. The imagery corresponding to the interactive solid (691) may also be generated by input from a second user (not shown) in a separate capsule (not shown). When the imagery is generated by a second user in a separate capsule, the interactive solid (691) is controlled by the second user and optimally is adapted to mimic the motions of the second user in the confines of the second capsule. Similarly, if the second user is interacting with a similar interactive solid in the second capsule, the second interactive solid will be controlled by the first user (690) and mimic that user's motions.

In FIG. 17, the user (690) may be supported by an interactive support apparatus (600) similar to the interactive support apparatus shown in FIG. 9. The interactive solid (691) may also be supported by an interactive support apparatus (600). An alternate embodiment of the interactive support apparatus (600) includes a rotation ring (650) for imparting complete rotation of the interactive solid (691) about the longitudinal axis of its torso. The rotation ring (650) permits a variety of interactive positions.

Figure 18:
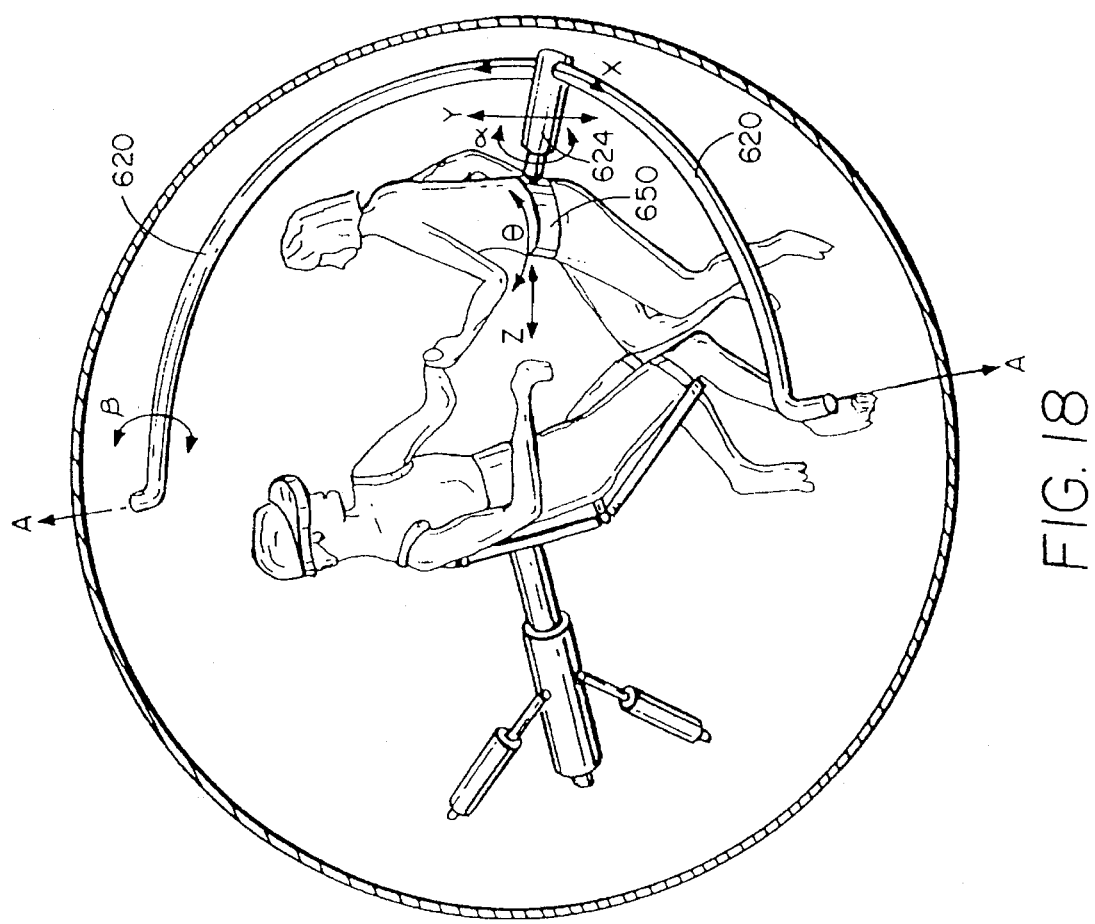
FIG. 18 is an elevational view of an interactive solid in accordance with another embodiment of the invention with a positioning track.

FIG. 18 depicts an alternative support apparatus (620) of the present invention for imparting greater freedom of movement to the interactive solid (691). The interactive support apparatus may include a linear actuator (624) which is movably attached to a positioning track (620). The positioning track (620) is mounted to the inner surface of the capsule at its ends. The linear actuator (624) moves the interactive solid (691) in and out along the longitudinal axis of the actuator. The movable contact of the linear actuator (624) along the arc of the positioning track (626) enables enhanced positioning of the interactive solid (691). A rotation ring (650) may be attached to the free end of the linear actuator to rotate the interactive solid (691) 360° about an angle relative to the longitudinal axis of a torso of the interactive solid.

Figure 19B:
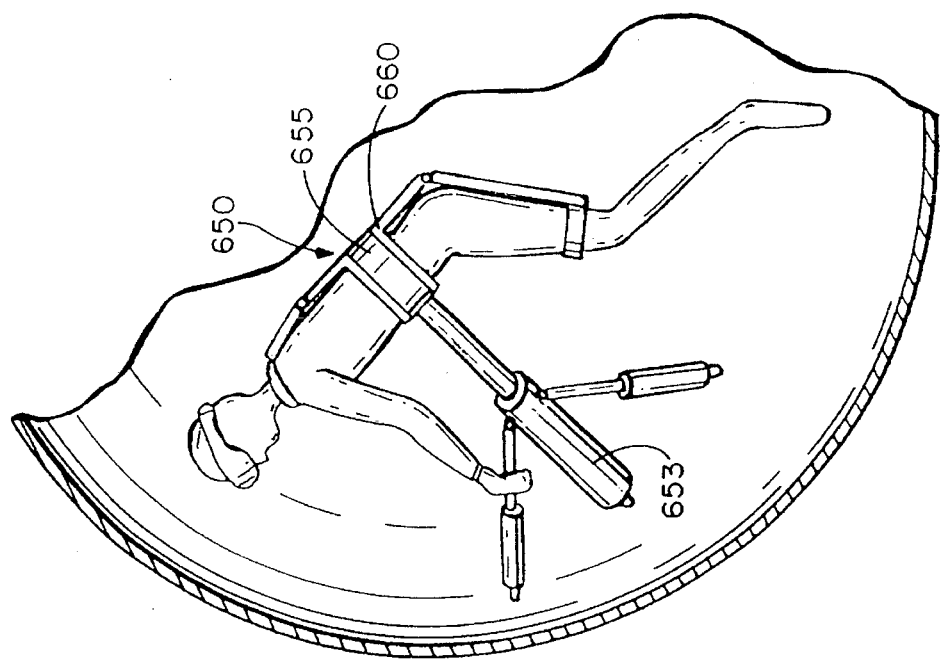
FIG. 19 is an elevational view of an interactive support apparatus in accordance with another embodiment of the invention.
Figure 19A:
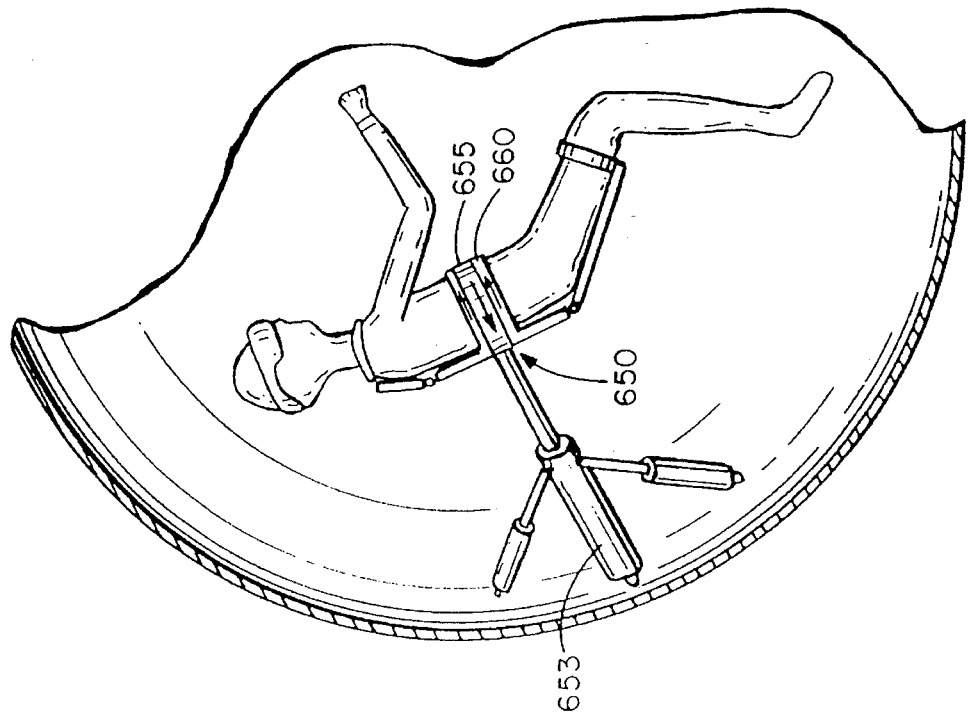

FIG. 19 schematically shows operation of the rotation ring (650) permitting the user (690) or an interactive solid to move into alternate positions. The rotation ring (650) may include a fixed ring (655) which is rigidly connected to the linear actuator (653), and a moving ring (660) which engages the fixed ring (655) along its outer surface and support the user with its inner surface. The moving ring (660) rotates within the fixed ring (655) to permit the user a full 360° rotation or to impart a full 360° of motion to an interactive solid (not shown). Any suitable means known in the art, such as gear and motor assemblies or hydraulics, may impart the rotation to the moving ring (660).

FIG. 20 depicts an embodiment for a vehicular motion simulator. A lower hemisphere (22) is supportively abutted by the active rollers (60) that are connected to the frame (40) as described in FIG. 2. Four high frequency linear actuators (149) may be connected to the inside wall of the lower hemisphere (22) and connected to the four corners of a seat (126). The high frequency motion conveyed by the high frequency linear actuators (149) to the seat (126) simulates the high frequency vibrations of a vehicle traveling over a road. The low frequency motion of the vehicle such as cornering or acceleration may be provided by the actuators (148) and active rollers (60).

Given any data exchange format, a user inside the sphere may either be passive or active. A passive user might put a ROM disk into the CD disk drive, or interface with a cable television channel. The user might then be guided through an amusement park ride where such a tide would have nearly all of the characteristics of a real ride.

Alternatively, an active user might interface with a dedicated data link to a central node computer and participate in a continuous game involving many players operating in their own virtual reality environment at separate locations. These individual users will each share the same "virtual space" and could compete or otherwise interact as if they were in the same physical space. Such interaction may involve conversations or physical contact such as dancing.

The invention may also include other means for stimulating a user's senses such as smell, taste, and temperature. Since the capsule forms a closed environment, it is within the spirit of the invention to include stimulating all known senses.

According to the provisions of the patent statutes, we have been explaining the principle, preferred construction and mode of operation of our invention and have illustrated and described what we now consider to represent its best embodiments. However, it should be understood that within the scope of the intended claims, the invention may be practiced otherwise than as specifically illustrated and described.

What is claimed is:

1. A motion simulating device, comprising:

a generally spherical capsule;

a translatable frame for supporting said capsule, the translatable frame including a plurality of beams, a plurality of connecting joints and actuator legs, wherein each connecting joint is rigidly attached to two of said beams and each actuator leg is connected on one end to one of said connecting joints and on the other end to a supporting surface; and a plurality of rollers connected to said frame and supportively abutting said capsule, wherein at least one of said rollers comprises an active roller for rotationally driving said capsule in any direction.

2. The motion simulating device of Claim 1, further comprising a means for interactively controlling the motion of said capsule and said frame.

3. The motion simulating device of Claim 2, wherein the interactive control means comprises:

a visual display;

a means for sensing the position of said capsule;

a means for coordinating the motion of said capsule and a representation of motion on said visual display; and a means for controlling the motion of said capsule responding to a representation of motion of the user on said visual display.

4. The motion simulating device of Claim 3, further comprising:

a means for sensing the position of a user within said capsule;

a means for coordinating the motion of a user and a representation of motion on the visual display; and a means for controlling said interactive solids responding to a representation of the motion of a user on visual display.

5. The motion simulating device of Claim 1, wherein said frame further comprises:

a plurality of beams;

a plurality of connecting joints, each rigidly attached to two of said beams; and actuator legs, each connected on one end to one of said connecting joints and on the other end to a supporting surface for supporting.

6. The motion simulating device of Claim 1, wherein said connecting joints further comprise:

beam receptacles, each fixedly attaching one end of said beams to said connecting joint; and a mounting plate for fixedly attaching one of said rollers to said connecting joint.

7. The motion simulating device of Claim 1, wherein said actuator legs further comprise a means for changing the length of said actuator legs.

8. The motion simulating device of Claim 7, wherein said means for changing the length of said actuator legs further comprises a hydraulic cylinder for telescoping a movable rod along the longitudinal axis of a support housing.

9. The motion simulating device of Claim 7, wherein said means for changing the length of said actuator legs further comprises a ball screw for telescoping a movable rod along the longitudinal axis of a support housing.

10. The motion simulating device of Claim 1, wherein said actuator legs are each rotatably connected on one end to one of said connecting joints and on the other end to a supporting surface.

11. The motion simulating device of Claim 1, wherein said active roller comprises:

a drive wheel rotatable about a drive axis generally parallel to a tangent to the surface of said capsule and frictionally engaging said capsule; and a yoke for orienting the drive axis with respect to said capsule, said yoke being pivotable about an axis generally perpendicular to the drive axis.

* * * * *